DEVICE FOR AUTOMATICALLY FILLING VEHICLE TANKS WITH MOTOR FUEL

Filed July 26, 1967

INVENTOR.
Irwin Ginsburgh

Sept. 8, 1970 I. GINSBURGH 3,527,268

DEVICE FOR AUTOMATICALLY FILLING VEHICLE TANKS WITH MOTOR FUEL

Filed July 26, 1967 14 Sheets-Sheet 2

INVENTOR.
Irwin Ginsburgh

INVENTOR.
Irwin Ginsburgh

INVENTOR.
Irwin Ginsburgh

INVENTOR.
*Irwin Ginsburgh*

DEVICE FOR AUTOMATICALLY FILLING VEHICLE TANKS WITH MOTOR FUEL

Filed July 26, 1967 14 Sheets-Sheet 6

INVENTOR.
Irwin Ginsburgh

DEVICE FOR AUTOMATICALLY FILLING VEHICLE TANKS WITH MOTOR FUEL

Filed July 26, 1967 14 Sheets-Sheet 7

INVENTOR.
Irwin Ginsburgh

INVENTOR.
Irwin Ginsburgh

INVENTOR.
Irwin Ginsburgh

INVENTOR.
Irwin Ginsburgh

INVENTOR.
Irwin Ginsburgh
BY James F. Simons
ATTORNEY

INVENTOR
Irwin Ginsburgh
BY James F. Simons
ATTORNEY

DEVICE FOR AUTOMATICALLY FILLING VEHICLE TANKS WITH MOTOR FUEL

Filed July 26, 1967

INVENTOR.
Irwin Ginsburgh
BY James F. Simons
ATTORNEY

INVENTOR.
Irwin Ginsburgh
BY James F. Simons
ATTORNEY 3,527,268

DEVICE FOR AUTOMATICALLY FILLING VEHICLE TANKS WITH MOTOR FUEL

Irwin Ginsburgh, Morton Grove, Ill., assignor to Standard Oil Company, Chicago, Ill., a corporation of Indiana
Continuation-in-part of application Ser. No. 410,913, Nov. 13, 1964. This application July 26, 1967, Ser. No. 656,171
Int. Cl. B67d 5/14
U.S. Cl. 141—98 16 Claims

ABSTRACT OF THE DISCLOSURE

Automatic fueling structure for motor vehicles having vehicle positioning means, fuel dispensing apparatus including means for opening any flap covering the fuel tank inlet and for removing any cap on said inlet, and control means for customer selection of fuel.

This application is a continuation-in-part of Ser. No. 410,913, filed Nov. 13, 1964, entitled Device for Automatically Filling Vehicle Tanks With Motor Fuel.

This invention relates to a system for automatically fueling automotive vehicles and, in particular, provides an apparatus for automatically and selectively dispensing motor fuel at retail gasoline and fuel oil stations. In certain specific aspects, the invention relates to accessory systems useful in the retail or consumer distribution and dispensing of oil and related products.

The retailing of motor fuel for automobiles is a major business in the United States, and is becoming increasingly important in Western Europe and in other industrial nations. In the United States alone, there are currently approximately 220,000 service stations engaged in retailing gasoline. About 50 billion gallons of gasoline are sold annually in the United States for the fueling of automobiles. Additional but much less amounts of diesel fuel are sold annually. A significant proportion, in the range of 4 to 7¢ per gallon, of the retail cost of gasoline is attributable to the operation, as currently practiced, of retail gasoline service stations. Such amount is generally referred to as "dealer's margin," and varies generally within such range depending upon geographical location, the policies of the supplying refining company, and prevailing economic conditions. However, assuming a dealer margin of 5¢ per gallon as a conservative average, it is apparent that the cost in the United States of retailing gasoline, after the same has been delivered to the service sation, totals about $2.5 billion annually. The relative magnitude of the cost of retailing gasoline relative to the overall cost of furnishing gasoline to the public is apparent from recognition that the average retail price of gasoline in the United States, exclusive of taxes, is about 20¢ per gallon, whereas the price of crude petroleum at the wellhead averages about 7¢ per gallon (equivalent to $2.94 per barrel). Despite the general trend in the United States to mechanize and automate operations which involve a high percentage of labor, the manner of dispensing gasoline at retail has changed little in the last four decades.

Broadly stated, my invention contemplates an automatically controlled fueling system for automotive vehicles which includes: dispensing means including a dispensing head for transferring fuel from bulk storage to a fuel tank in such vehicles; means for locating a vehicle to be fueled in reference to the dispensing means or some predeterminable neutral control point; means for guiding the dispensing head to an inlet in the vehicle's fuel tank; means for engaging a discharge nozzle in the dispensing head with the fuel inlet; means for controllably flowing fuel through the nozzle into the tank; means for disengaging the dispensing head from the fuel inlet; numerical control means inclusive of a stored program of guidance control information based on the location of fuel tank inlets in such automotive vehicles relative to any predetermined control point of the fueling system and means associated with the stored program for selectively actuating and automatically controlling the guidance and operational movements of the dispensing head as well as the nozzle and other elements associated with the dispensing head and with fuel control; and means for selectively initiating the operation of the numerical control means and the flow of fuel through the dispensing system. Advantageously, the last stated means comprises identification-selector means which is adapted to transmit a signal identifying the vehicle to be fueled with respect to make and model and to provide means for selecting the quantity and grade of fuel to be dispensed by the system.

The invention is more particularly directed to refueling an automotive vehicle such as a conventional automobile which is provided characteristically with a fuel tank, an inlet to the tank, a gas cap or other closure preventing the spillage or evaporation of fuel from the tank, and generally, but not always, a flap which conceals the tank inlet but which may be readily moved to permit access to the inlet. Although my invention is applicable for the refueling of trucks, it is particularly useful in refueling automobiles. Any liquid fuel may be dispensed, such as motor gasoline for piston-type engines, kerosene-type fuel for turbine engines (which may come into common use in automobiles and trucks in the future), or diesel fuel for diesel engines.

The system here provided comprises vehicle locating means adapted to correctly position the vehicle with respect to the refueling system. The vehicle locating means may also include means for automatically ascertaining the position of the vehicle relative to the refueling system if the vehicle positioning means is designed to permit variations in the lateral, longitudinal or vertical position of the vehicle. After the vehicle has been correctly positioned, the vehicle is identified by any of several means in terms of its model year, manufacturer (e.g., Plymouth, Chevrolet, Ford), model and body style. Based upon the identification of the automobile in such terms, the machine automatically and without human assistance guides a fuel dispensing head adjacent to the fuel tank inlet of the automobile. The fuel dispensing head carries a cap removal means adapted to remove the gas cap from the fuel tank inlet, and at least one extendible and retractable nozzle connected to a flexible conduit or hose through which the fuel is pumped into the vehicle's fuel tank. Generally, the dispensing head also carries a flap opening means adapted to open the flap, which permits access through the body shell to the fuel tank inlet. The design of the dispensing head is dependent upon the degree of automation desired in the overall dispensing system as well as upon the choice of mechanical and/or electrical devices utilized in the system. One preferred design is more particularly covered in copending application, Ser. No. 441,061, filed Mar. 19, 1965 of I. Ginsburgh, H. J. Nevelsiek and L. T. Wright.

After the dispensing head has been positioned opposite the fuel tank inlet, the flap opening means opens the flap and restrains it if necessary, the cap removal means remove the gas cap from the inlet, and retains it, and the nozzle is extended into the gasoline tank inlet. All of these operations are performed automatically based upon programmed instructions peculiar to the model year, manufacturer, model and body style of the vehicle being refueled.

After the nozzle has been properly positioned, fuel is pumped into the vehicle's fuel tank. As described hereinafter, the amount of fuel so pumped may be based upon a specified volume, a specified monetary value, or until the fuel tank is full. After the pumping operation is complete, the machine automatically withdraws the nozzle from the inlet, replaces the cap, returns the flap to its normal position, and withdraws the dispensing head away from the vehicle. Optionally, means are provided to release the automobile from its position and to signal the driver that the refueling operation is complete.

Optionally, embodiments for automatically fueling vehicles are included wherein inlet means are provided at other than the conventional locations so that it is unnecessary to open a flap or remove a cap prior to the commencement of the actual filling operation. For example, inlet means can be an integral part of the fuel tank itself or the inlet means can be located more remotely from the tank yet in communication with the tank through conduit means and are all within the purview of this invention. The inlet may be located at practically any place on the vehicle providing that this location is substantially standardized on all vehicles, such as a particular distance from a datum plane or location as, for example, a vertical plane through the center of the rear wheel or any other of a myriad of reference points or planes.

Embodiments exemplifying a substantially standardized location for the inlet means at any location on a vehicle such as a front fender, the fuel tank itself, the rear axle, etc., requires a vehicle locating means to position the vehicle with respect to the refueling system. An actuated fuel dispensing head and means associated with actuating and controlling the flow of fuel in response to a customer's selection of type, grade, amount, etc., of the fuel desired.

Thus, the customer desiring fuel in any amount, type, grade, etc., drives his vehicle into the station equipped to dispense fuel without the aid of an attendant. The vehicle is automatically positioned with respect to the dispensing system and the customer makes his selection by pressing buttons located on a console adjacent the driver, and by the insertion of money or a credit card the system is actuated. The actuation of the system causes the dispensing head to communicate with the inlet means and when no communication exists with the atmosphere fuel is delivered in accordance with the customer's selection. Should the tank fill before the amount selected has been delivered fuel flow is terminated and the customer's account or monies deposited is adjusted or returned accordingly.

Before considering the functional capabilities of each of the major elements of the apparatus, and because of the novelty of the system, reference is now made to FIG. 1, which is an isometric schematic view of refueling station equipped with the automatic dispensing equipment described herein. FIG. 1 shows two automobiles in position for refueling on each side of an island 32 (as that term is used in the gasoline retailing business) upon which is disposed two typical gasoline pump stands 34. In between the pumps in a console 36 which bears a number of buttons or switches, as hereinafter described, through which the driver of the automobile exchanges with the apparatus information regarding the identification of the automobile in terms of its model year manufacturer, model and body style, and the type and amount of fuel desired.

Above console 36 is dispensing head 38 suspended in yoke 40 from vertical elevator 42. Elevator 42 is carried by, and extends above, carriage 44 which is supported by and traverses along bridge 46, which in turn is supported by and traverses along crane rails 48 and 50. Posts 52 support the crane rails and also support optional roof 54. Two fuel hoses 56 are shown entering the top of elevator 42 and lead into the elevator from fuel pumping means not shown, which draws fuel from a fuel storage tank, also not shown. Flexible hoses 58 lead from the base of elevator 42 into the rear end of dispensing head 38.

Dispensing head 38 carries flap opening means, gas cap removal means and nozzle projection means, which are merely schematically illustrated in FIG. 1 by the small circles on the face of dispensing head 38 and described in specific detail hereinafter. When dispensing head 38 is centered above island 32 as shown in FIG. 1, it is in its neutral position with respect to each automobile.

Lateral and longitudinal vehicle positioning means 60 are constructed into the grade surface of the refueling station. A pressure sensing plate 74 detects that the automobile has advanced until the left front wheel rests on the plate.

Barrier gates 62, 64, 66 and 68 are mounted on barrier posts 70 and 72, respectively, at each end of island 32, and function to direct automobiles to the proper side of island 32. Gates 64 and 66 normally are open when no automobiles are being serviced, but close after an automobile drives in to be serviced. Gates 64 and 66 keep the automobile next in line for service from moving in close so that there is sufficient clearance for dispensing head 38 to operate properly. Gates 62 and 68 are raised when the servicing operation is complete.

The first element to consider in more detail is the vehicle positioning means 60 for laterally and longitudinally positioning the automobile with respect to the over-all fuel dispensing apparatus. Because of the automatic character of the process and device, the diversity, in terms of model year, manufacturer, model and body style, of the automobile currently used by the motoring public, and the diversity of locations on such automobiles of the fuel tank inlet, it is necessary to locate each automobile with respect to the over-all apparatus prior to starting the refueling operation. The position of the automobile with respect to the apparatus may be approximate, being merely with a certain range of lateral and longitudinal distances from reference points, or it may be fairly precise, to a tolerance of about plus or minus ¼ inch in each direction measured from appropriate reference positions on a car as later described. If the automobile positioning is only approximate, it is necessary to provide the apparatus with means to measure for each individual vehicle to be refueled the distance from fixed reference points to the vehicle, and to design the hereinafter described dispenser head positioning means to compensate for the variations in such distances. Because of the added complexity necessarily required of the apparatus when the vehicle positioning means is designed for only approximate accuracy, we consider it advantageous to design such means to position the vehicle with greater precision, illustratvely to a tolerance of plus or minus ¼ inch laterally and longitudinally. One specific system for so doing is covered in copending application, Ser. No. 441,248, filed Mar. 19, 1965 by I. Ginsburgh, E. Runes, H. J. Nebelsiek, and R. A. Sholts.

A particular part of an automobile used as the reference point for longitudinally positioning it may vary and may include, for example, the front or rear bumper or either axle. Use of the rear axle for longitudinally positioning is advantageous because its use minimizes the amount and complexity of the necessary positioning means, and also minimizes the risk of damage to the vehicle or the apparatus. The use of the rear axle as the reference point for longitudinal positioning is particularly advantageous in any system wherin the driver of the vehicle must execute some manual initiation of the refueling operation because this will position the drivers of all automobiles in about the same spot.

A simple, effective longitudinal vehicle positioning means is a saucer-like or V-shaped trough, either formed in the surface of the service station driveway or in a ramp over which the automobile is driven, and into which the left rear wheel, or both rear wheels, come to rest. The presence of the rear wheel or wheels in such a trough may be detected by a pressure sensitive mechanism. The degree of accuracy of longitudinal positioning need not be extreme; a tolerance of plus or minus ¼ inch from a vertical plane drawn through the axis of the rear axle is acceptable. Optionally, and to assure that the rear wheels rather than the front wheels are in the trough, means may be provided to detect, prior to starting the refueling operation, if the front wheels or the major portion of the automobile are forward of the rear axle trough. Such detection may be done in many ways, such as photoelectrically or with pressure sensitive mechanical means.

The vehicle positioning means also includes means to position the automobile laterally with respect to the overall apparatus. Although the precision required for laterally spacing the automobile is not great, being again about plus or minus ¼ inch, it is desirable to have some part of the automobile positioned at a known lateral distance from the apparatus. The particular part of the automobile selected as a reference for lateral spacing may be any part, such as the body shell, but most suitably is the left rear tire. Use of the left rear tire permits establishing as a plane of reference the vertical plane perpendicular to the rear axle and passing through the center of the tire.

A suitable means for laterally positioning the vehicle are converging smooth guide rails or curbs acting against the tires on one side of the automobile. Optionally, one such guide rail may be spring loaded to gently urge the tires against the opposing rail. Alternatively, an appropriately contoured shallow depression in the driveway surface may be used for lateral positioning. To permit the automobile to be moved sideways readily in response to the guide rail or curb, long freely rotatable rollers are disposed parallel with the path of the automobile and underneath the path of the wheels on the opposite side of the automobile.

After positioning, the next step is identification of the automobile advantageously in terms of four primary criteria: model year, manufacturer, model and body style. These four criteria define each model of automobile. The vehicle identification means is related to the hereinafter described dispensing head positioning means and is desirable in a fully automatic system in view of the diversity of fuel tank inlet locations on automobiles. The identification may be fully automatic, using photoelectric means to detect the silhouette of the automobile. For greater accuracy, two silhouette views are preferable.

Identification means designed to be actuated by some participation of the customer are preferable. One such customer participation identification means involves the use of an identification card appropriately notched or embossed in a manner identifying the automobile by the four primary criteria referred to above. Advantageously, such identification card can also serve as the customer's charge account card. Using such a card, the customer inserts the card into a card reader which comprises an element of the identification means and the identification of the automobile is in this manner communicated to the apparatus. Use of an appropriately notched or embossed credit card as part of the identification means may also be associated with hereinafter described pumping means adapted to record a non-cash sale. Because the horizontal distance between the rear axle of American automobiles and the position of the driver varies relatively slightly, any card reader used as part of the identification means may also be positioned on a console to permit the driver's reaching to it without getting out of the automobile. In a more automatic variation of the identification card alternative, such a card may be affixed to the automobile, for example, to the left side of the windshield or to the left front window, and read photoelectrically or mechanically by the identification means.

The use of identification cards as the sole means of identifying the automobile has certain limitations, inasmuch as not all potential customers might have such a card. A more general identification means has been designed whereby the customer manually signals to the apparatus the identification of his automobile by operating one or more buttons, toggle switches, or dials. In this embodiment, a console positioned adjacent to the driver's seat is provided with buttons for each combination of automobile model year, manufacturer, model and body style designation, and the drive merely pushes the buttons which identify his automobile. Inasmuch as there are about one hundred such combinations per model year, thereby requiring about one thousand buttons to accommodate automobiles manufactured within the past ten years, some simplification of the console is desirable.

A preferred identification means comprises an elevated rotatable cylindrical console bearing appropriate push buttons or switches whereby the driver, after the automobile is positioned, identifies the automobile by pushing in sequence buttons indicating the model year, manufacturer, model and body style description, e.g., 1963, Chevrolet, Impala 4-door sedan. The order of the sequence is not critical and the console may be designed for other sequences. The rotatable character of the console permits it to carry all of the necessary buttons and still permit the driver to reach all the buttons without leaving his seat, and is advantageous when the same console is to serve both sides of a refueling island.

At some point a customer must inform the apparatus of the amount and grade of fuel (if more than one grade of fuel is dispensed) or blend of fuel he desires, and must arrange to pay for the fuel. The apparatus associated with receiving and implementing such information is called fuel determination means. The amount of fuel desired may be designated by a definite volume, or by instructing the apparatus to fill the fuel tank ("fill 'er up"). Such a volume specification for the fuel determination means is appropriate when the customer is using a charge account card, but is somewhat less desirable with a cash customer because of the problem of arranging for payment. For cash customers, it is preferable to use an arrangement whereby the customer inserts the amount of money, bills or coins or a combination thereof, he desires to pay for the fuel and the apparatus pumps an appropriate amount of fuel in response thereto. Selection of the grade of fuel is appropriately done by the customer actuating appropriate push buttons, toggle switches, or a dial. The console referred to above may be used to carry the necessary buttons or dial to be actuated by the customer as part of the fuel determination means. In the event a customer actuates the wrong button or switch during the sequence of identifying the car and selecting the fuel, the error may be corrected by providing a reject, or "clear," button which permits the error to be corrected.

As an optional feature, a start button may be provided as the last actuation step to be performed by the customer. Requiring the customer to perform a final starting actuation step is not, however, necessary for operability, inasmuch as the apparatus may be designed to continue automatically through completion of the refueling operation after identification of the car and actuation of the arrangement for payment.

For the sake of safety and customer psychological satisfaction, it is desirable to provide an emergency stop button to stop the refueling operation upon command of the customer. It is also desirable, and often required by law, that the customer be able to observe the amount, value and type (premium, regular or blend) of fuel being dispersed. Adaptations of the typical gasoline pumps now in use may be used to permit the customer to so observe. Certain novel features of the foregoing console selection system are described in copending application, Ser. No. 475,221, filed July 27, 1965, of I. Ginsburgh and L. T. Wright.

It is desirable also to provide some barrier means adapted to restrain movement of the automobile during the refueling operation. Such barrier means may be in the form of a vertically or horizontally projecting arm or gate which restrains the movement of the automobile, or checks against one or more wheels. Also, it is desirable to provide an additional barrier to prevent another automobile from entering the occupied side of the service island while an automobile is refueling.

Before proceeding to characterize the movements of the apparatus necessary for the refueling operation and subsequent to the input of information identifying the vehicle model and the amount and quality of fuel desired, it is desirable to describe broadly how such movements are controlled. More than a single set of such movements is manifestly necessary in view of the many models of automobiles which would be serviced commercially, inasmuch as there are about 100 models of automobiles manufactured in the United States each model year and their road life can be as long as 14 years. Thus, the apparatus is advantageously designed to handle at least 1,000 automobile models and may readily be designed to handle a greater number. In the absence of intentional design uniformity by an automobile manufacturer, the fuel tank inlet configuration and location relative to standard reference points will only coincidentally be the same for any two models, although this often occurs, for instance, in a 1964 Chevrolet Impala two-door sedan and a 1964 Chevrolet Bel Air four-door sedan. Thus, each model requires its own set of instructions.

Our apparatus uses a numerical control system in executing the various diverse movements necessary for automatically refueling many models of automobiles. Numerical control denotes a method of controlling a machine automatically in which a complete set of instructions is given to the machine whereby all its movements follow such instructions in the execution of its intended operation. Such instructions are often called a stored program. Numerical control systems have been known heretofore and are finding increasing use where the same assembly of mechanical and electrical elements is to be used to execute either a diversity of operations or to act repetitively upon other objects which vary significantly in configuration or position, such as automatic machine tools. A characteristic of numerical control systems is their capability to make, or cause to be made, measurements, directly or indirectly, of the distances, either angular or linear or both, through which the mechanical elements of the machine have traversed, and to compare such measurements against instructions in the stored program in order to assure proper execution of the intended operation.

Programs may be stored on rotary cylindrical mechanical controllers (which comprise a rotating drum from which protrude small pins which act somewhat like cams on electrical or mechanical actuating means, rather like the early music boxes), on punched cards, and on either punched or magnetic tape. The rotary mechanical controllers are somewhat cumbersome for the duty here required. Punched cards require more cumbersome sorting means than is desired relative to tapes although all the necessary instructions for a single model of automobile can be punched onto a card measuring about 5 inches by 8 inches. Currently, we prefer to use punched tape for the stored programs, because of its speed and compactness relative to rotary controllers or punched cards, and its superior reliability relative to magnetic tape. However, relative to punched tape, magnetic tape offers a significant reduction in space requirements and a significant reduction in tape searching time. If, in the future, its reliability and single line read out characteristics evolve to a satisfactory level, it may become more desirable than punched tape.

A suitable punched tape is 2 inches wide bearing 16 longitudinal channels per line with 10 transverse lines per linear inch. Each channel on each line has room for the punching therein of a hole, and the presence or absence of such a hole in each channel along a line comprises one piece of stored data which, in combination with other such data, comprises an instruction. The presence or absence of the holes is determined by a reading head utilizing mechanical, pneumatic or photoelectric principles. A photoelectric reading head is desirable because it minimizes tape wear. Magnetic tapes are, of course, read magnetically. By appropriate combinations of electrical, electronic, mechanical, hydraulic and pneumatic means, each instruction is executed and, often, the completion of the execution of such instruction confirmed. Capability may be provided for the concurrent execution of a plurality of instructions.

The amount of information necessary for each instruction or tape position identification determines the number of channels necessary on the tape, subject, however, to the fact that equipment is now available for reading a single instruction from a plurality of consecutive lines on a tape; hence, and speaking broadly, 2 consecutive lines on an 8-channel tape are broadly equivalent to a single line on a 16-channel tape.

The description now returns to the broad characterization of the elements, and their movements, of the over-all apparatus.

The dispensing head, which carries one or more fuel nozzles, is positioned adjacent the fuel tank inlet by guidance means responsive through the numerical control system to the automobile identification means. The guidance means comprises electrically, hydraulically or pneumatically operated prime movers which move the dispensing head laterally, longitudinally, vertically and angularly from its neutral position (to which it is returned after each refueling operation) to the fuel tank inlet. Electrical motors are preferred prime movers, because of the precision with which their movements and the movements of the mechanical elements driven by them may be measured and controlled. Chain and sprocket, various types of gears, and rack and pinion means are advantageously used as the mechanical linkage elements because of the minimal slippage in their movements. The dispensing head positioning means also comprises a continuously operating variable vertical positioning means hereinafter described.

From a known neutral position of the dispensing head and the known position of the reference planes of an automobile (e.g., a vertical plane through the rear axle and a vertical plane through the center of the left rear tire and perpendicular to the rear axle—the intersection of such planes forming a plumb line), the lateral and longitudinal distances through which the dispensing head must move to position it adjacent the fuel tank inlet are readily calculable for each model of automobile. This is because, for each such model, the lateral and longitudinal distances from the reference planes to the fuel tank inlet and to the dispensing head's neutral position are fixed distances.

However, the net vertical distance from the neutral position through which the dispensing head must move is the difference between the known and constant vertical elevation of the dispensing head in its neutral position above a datum plane, such as the grade level of the service station, and the variable vertical distance between the fuel tank inlet and such datum plane. The latter distance not only differs from one model of vehicle to another, but varies within each model because of varying loads carried by the vehicle, and such things as the condition of its suspension system and the extent of inflation of its tires. Furthermore, such distances is subject to continuous variation during refueling as a result of changes in the load carried by the automobile, such as by passengers shifting position, and as a result of the addition of the fuel itself.

Accordingly, as described in additional detail in copending application, Ser. No. 441,269, filed Mar. 19, 1965, of I. Ginsburgh and L. T. Wright, it is necessary to measure continuously such variable vertical distance. This may be done by measuring with a vertically extendible probe, which is an element in the variable vertical position determining means, the distance from the datum plane to a preselected location on the vehicle, advantageously on the underside of the vehicle. Such location desirably has an essentially horizontal surface. Because there does not appear to be any single location on the underside of all automobiles which is suitable, it may be necessary to have a plurality of extendible probes, or a single movable probe which can be positioned for each refueling operation in response to the identification of the automobile, and then extended to measure the vertical distance. A single fixed probe may be used if it carries on its upper end a flat detecting member of relatively large surface area, on the order of 8 inches by 12 inches, disposed in a horizontal plane and substantially rigidly affixed to the probe. The size of such area may vary, depending upon the underside configuration of the various models of automobiles to be serviced.

In operation, the probe is extended upwardly, in response to an instruction, until its detecting member stops against an obstruction on the underside of the automobile. For each automobile, the relative location of the obstruction and the vertical distance from such obstruction to the fuel tank inlet will be determinable and constant. Hence, this latter vertical distance plus the distance the probe extends above the datum plane totals the vertical distance from such plane to the vertical tank inlet and is subtracted from the elevation of the dispensing head in its neutral position to determine the net vertical movement of the dispensing head necessary to bring it adjacent the fuel tank inlet. Unlike the dispensing head's longitudinal and lateral positioning means, the circuits for the variable vertical positioning means and other components of the dispensing head's vertical positioning means are continuously operating during the refueling operation, and the elevation of the dispensing head is responsively and continuously adjusted. The measurement of the distance through which the variable vertical positioning probe is extended, and the algebraic summation of the various vertical distance measurements necessary to hold the dispensing head vertically adjacent the fuel tank inlet, may be performed by using linear variable differential transformers acting as transducers. Alternatively, such measurement may be done by pneumatic means, in which event it is desirable that the elevator's vertical prime moving means also be pneumatic.

The movement of the dispensing head need not be done solely by straight line movements, but may be so controlled by concurrent operation of a plurality of the elements comprising the dispenser head positioning means so as to trace a curve in space. The accuracy of positioning the dispensing head need only be about plus or minus ¼ inch along each axis. However, it is desirable that the movements of the dispensing head be known and ascertainable without slippage. Accordingly, motors are preferred prime movers relative to hydraulic or pneumatic means, and mechanical elements having fixed relationships, such as racks and pinions, gears, or sprocket chains are desirable mechanical linkages.

Fortunately, the precision of movement required of the dispensing head is well within the capability of engineering technology. At a tolerance of plus or minus ¼ inch, the necessary precision of movement is only about 1 part in 800 at its maximum, which is in the longitudinal direction, and in other directions is much less. This is in contrast to the precision of movement capability existing in numerically controlled machine tools, which is at least 1 part in 100,000. (In machine tool technology, this is often expressed as tolerance of plus or minus 0.001 inch over a 100 inch range of travel.)

After the dispensing head is properly oriented and in the desired position adjacent the fuel tank inlet, the flap opening means is extended to open the flap. The flap opening means may comprise a suitably manipulated magnet or vacuum cup, or a mechanical analog to the human arm and hand. We believe that the mechanical arm-hand analog is preferable from the standpoint of reliability, universal applicability and customer acceptance (which includes a number of factors, not the least of which is minimization of the risk of damage to the automobile).

The functional requirements of the flap opening means are that it open the flap, hold it open during the refueling operation and thereafter close the flap. The flap opening means described in greater detail herein after comprises a rigid arm shaft, a rotatable knuckle carried by the arm shaft, and a finger shaft, which is preferably rubber coated and tipped, rather like a person's fingertip, and slightly resilient, mounted on the knuckle. Such a flap opening means requires the capability of five movements: travel of the arm shaft along its longitudinal axis and rotation about that axis, rotation of the knuckle about an axis perpendicular to the arm shaft, and travel of the finger shaft along its longitudinal axis and rotation about such axis. The axes of the two shafts are perpendicular to the axis of the knuckle.

In operation, the arm and finger are extended, together where appropriate and with appropriate rotation, in response to the stored program instructions until the tip of the finger engages the inside of a tab, or recess in the flap, or the back of the flap itself. The finger, knuckle and, if necessary, the arm are then manipulated to rotate the flap on its hinge until open, maintaining contact between the flap and the finger with light pressure. To close the flap, the finger is disengaged from contact, is moved around to the outer side of the flap and gently pushes it shut. Marring of metal surfaces is avoided by covering the tip with a soft material such as heavy felt or sponge rubber and by providing suitable torque limiting clutches in the driving linkages or the flap opening means. Incorporating a spring into the finger provides resiliency and additional protection against marring metal surfaces, and minimizes the need for extreme accuracy in locating the opening notch or tab of the flap.

After the flap has been opened, the cap opening means removes the gas cap and holds it sufficiently far away to permit the nozzle to be subsequently inserted into the fuel tank inlet. The cap opening means must be able to locate the gas cap, hold it firmly, rotate the cap to disengage it from the fuel tank inlet pipe and move it out of the way. During the filling operation, the cap opening means maintains the cap in substantially constant alignment relative to the inlet pipe, and thereafter replaces the cap on the inlet pipe and properly tightens it. The cap opening means should compensate for the variation in the tightness with which gas caps are presented to the mechanism as a result of variations in hand tightening or loosening through mechanical vibration. Such variations manifest themselves in variations in the number of angular degrees through which a gas cap must be rotated before it first clears the engaging lip of the fuel tank inlet pipe and is in position to be withdrawn therefrom. Also, the cap opening means should be designed to accommodate both the many types of gas caps which have a tab disposed along a diameter and in a plane perpendicular to the circular top face of a gas cap, as well as those types which do not have tabs. The accommodation of such tabs and the compensation for variations in tightness may be done readily by designing the cap opening means to rotate about 360 angular degrees (or more) in removing the gas cap and then to rotate a comparable angular distance in the opposite direction in replacing the cap, but with the provision of a combination slip and torque limiting clutch in the linkage which permits the element holding the gas cap to stop rotating when the cap is either fully opened or closed, therefore avoiding damage to the automobile and simplifying the instructions in the stored program. The end of the cap opening means which comes in contact with the gas cap is desirably provided with a soft non-scratching covering which in some embodiments may need to possess high-friction characteristics to prevent slippage when torque is applied.

The cap opening means suitably comprises an extendible and retractable cap opening arm carried by the dispensing head and having disposed at its end a set of manipulatable fingers, vacuum means, or, advantageously, a magnet adapted to grasp the cap and rotate it. Magnets may be used because all the gas caps used in recent years are made of steel, although sometimes coated with another metal. Any such magnet should be slotted to accommodate the tabs used on gas caps, and the contact surface of the magnet covered by a high-friction material, such as Neoprene or a polyurethane, to prevent rotational slippage on gas caps which do not have a tab. Use of the magnetic principle in designing cap opening means provides greater assurance against slippage and simplifies the design and complexity of the apparatus relative to the use of manipulated fingers or vacuum means.

Removing the lossened gas cap away from the fuel tank inlet is easily done by retracting the cap opening arm. Alternatively, such arm may be designed to bend, rather like an elbow. In any event, the cap opening means must have the capability of retaining the gas cap in substantially the same alignment with the fuel tank inlet as exists when the cap is removed from the inlet in order that the cap be in the proper plane and position to fit over the perimeter of the fuel tank inlet when being replaced, and thus assure ultimate engagement with the inlet's closure means upon being rotated. Immediate engagement with such closure means upon initial rotation is not necessary in embodiments having the rotational characteristics and torque limiting clutch described above.

The dispensing head may have a single nozzle to dispense several grades of fuel. Each grade of fuel is stored separately and connected to a manifold or a multi-position valve and thence to the single nozzle. Preferably, however, a separate nozzle is provided for each grade of fuel, and the proper nozzle is brought into use in accordance with the grade of fuel selected.

The nozzle projection means is carried by the dispensing head and has the capability of projecting the nozzle outwardly from the dispensing head and inserting it several inches, desirably about 6 to 8 inches, into the fuel tank inlet pipe. Optionally but desirably, the nozzle projection means also has the capability of conducting the fuel vapors as they arise from the inlet back to a vent system. It is also desirable to provide the nozzle projection means with seal means to prevent fuel from spilling out of the inlet in the event the rate of the pumping of the fuel causes fuel to back-up in the inlet pipe. This may be done by providing a deformable conically-shaped element made of hydrocarbon resistant material designed to fit snugly under moderate pressure around the perimeter of the inlet. It is desirable that the nozzle itself be flexible yet sturdy, in order that it can be thrust downward well into the inlet pipe without deforming metal and without having to add complexity to the stored program to accommodate the diverse shapes of the first 6 or 8 inches of pipe leading from the inlet's mouth toward the fuel tank. Protection for the tip of the nozzle when it is not in use may be provided by retracting the nozzle within a nozzle projection sleeve or arm.

In operation, the nozzle projection means simply extends the nozzle into the fuel tank inlet pipe and thereafter retracts it after the completion of the fuel pumping step. Generally, no rotational capability is required. The cut-off valve, which stops the flow of fuel in the event fuel backs up in the inlet pipe, may be disposed in the nozzle or in the nozzle projection arm, but is advantageously placed further upstream from such arm, in the rear of the dispensing head. Such a cut-off valve should not only have the capability of automatically cutting off when the fuel backs up into the fuel tank inlet pipe, but also of automatically reopening if the fuel back-up is only temporary. Conventional shut-off valves now in use in gasoline pumps have the automatic cut-off capability, but require manual resetting. Such cut-off valve may be, and advantageously is, adapted to be the primary valve which controls the flow of fuel from the fuel storage tank.

Particular embodiments of the apparatus are set out in the annexed figures which form a part of this specification.

FIG. 1 (previously described) is an isometric schematic over-all view of a refueling station equipped with the automatic dispensing equipment described herein.

FIG. 2A is a schematic plan view of the lateral and longitudinal vehicle positioning means 60. FIG. 2B is a schematic elevation view of section A—A of FIG. 2A. FIG. 2C is an elevation view of section B—B of FIG. 2A. FIG. 2D is an elevation view of section C—C of FIG. 2A.

FIG. 3 illustrates a panoramic view of the face of console 36.

FIG. 4A is an isometric schematic view of the crane rails, bridge, carriage and the top of the elevator. FIG. 4B is a schematic vertical sectional view of section D—D of FIG. 4A. FIG. 4C is a vertical sectional view of section E—E of FIG. 4A. FIG. 4D is a partial sectional view of section F—F of FIG. 4C.

FIG. 5A is a schematic isometric close-up view of the dispensing head, its yoke and the lower portion of the elevator. FIG. 5B is a schematic plan view of the cover (or "face") of the dispensing head.

FIG. 6A is a partial sectional view of the forward portion of the dispensing head taken along its longitudinal axis at section G—G of FIG. 5A, and with the flap opening knuckle and arm rotated 180 degrees for clarity of illustration. FIG. 6B also is a partial sectional view of the forward portion of the dispensing head taken along its longitudinal axis at section J—J of FIG. 5A. (Section J—J is perpendicular to section G—G.)

Figure 12:
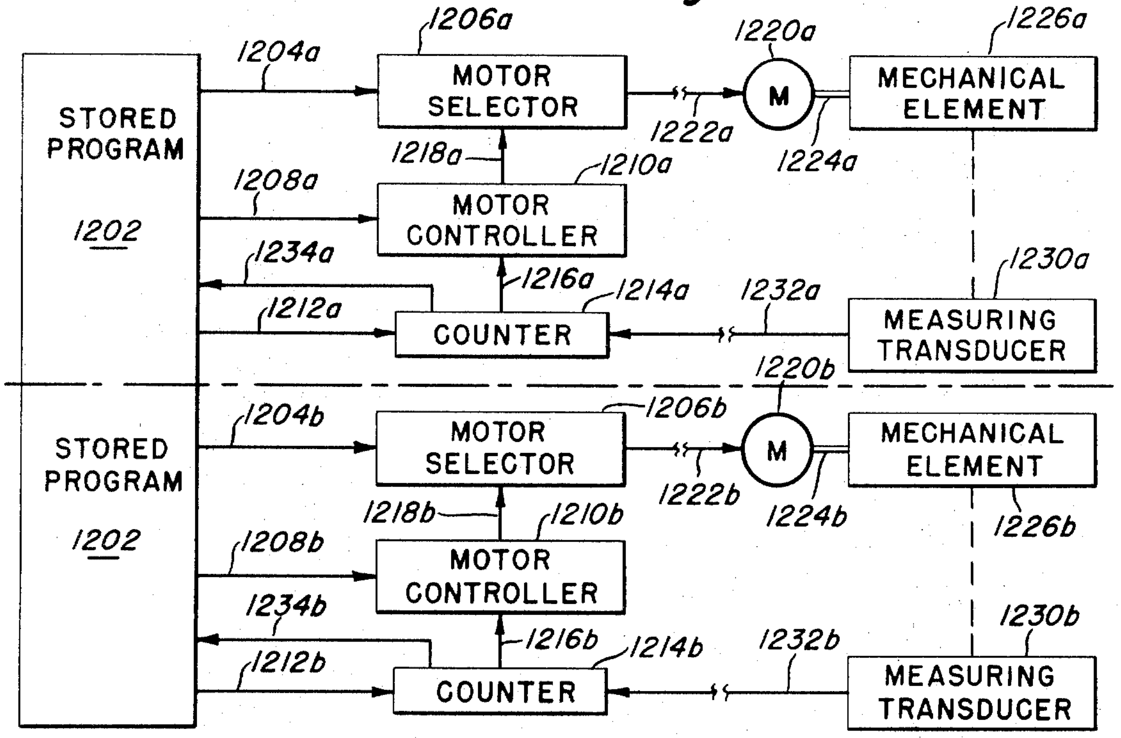

FIG. 12 symbolically illustrates the logic circuitry of the numerical control system utilized in operating the automatic fuel dispensing system.

Figure 13:
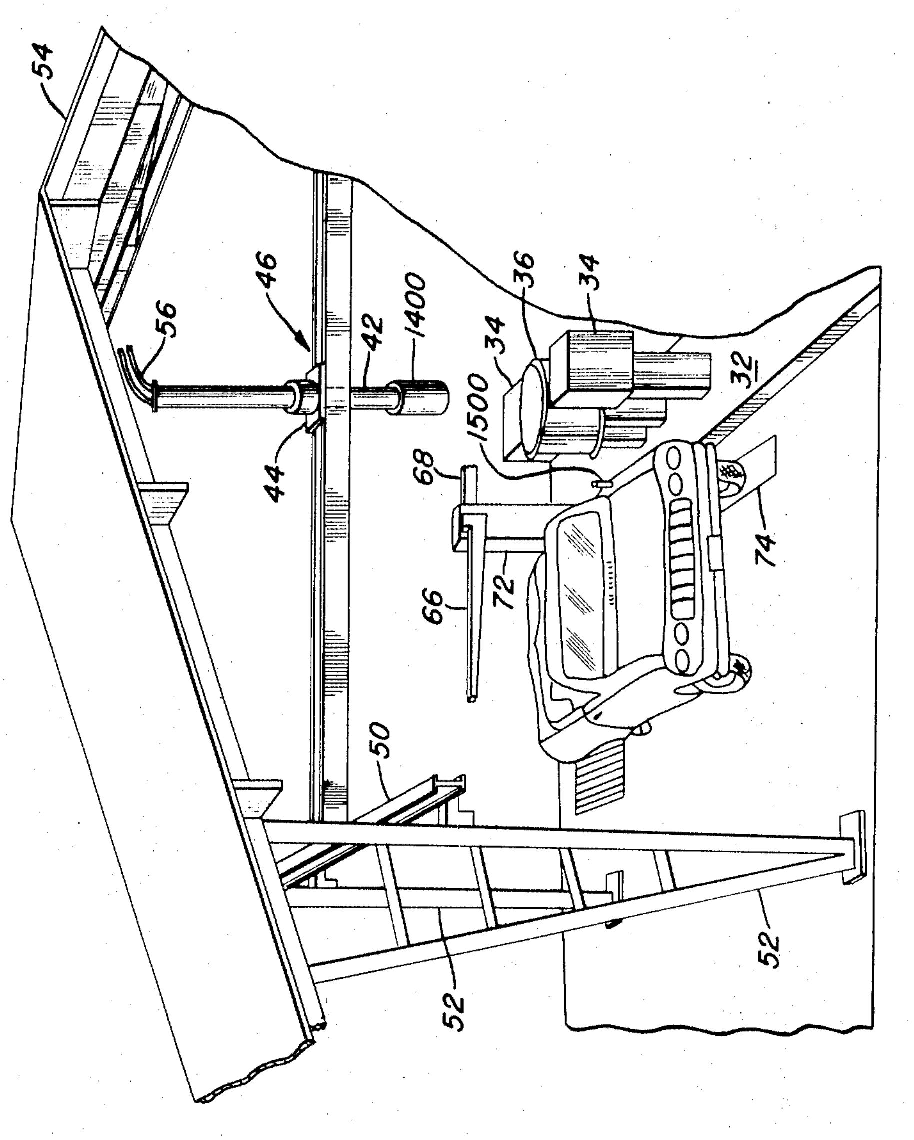

FIG. 13 is a perspective view of a portion of a refueling station equipped with an embodiment of the automatic dispensing equipment described herein.

Figure 14:
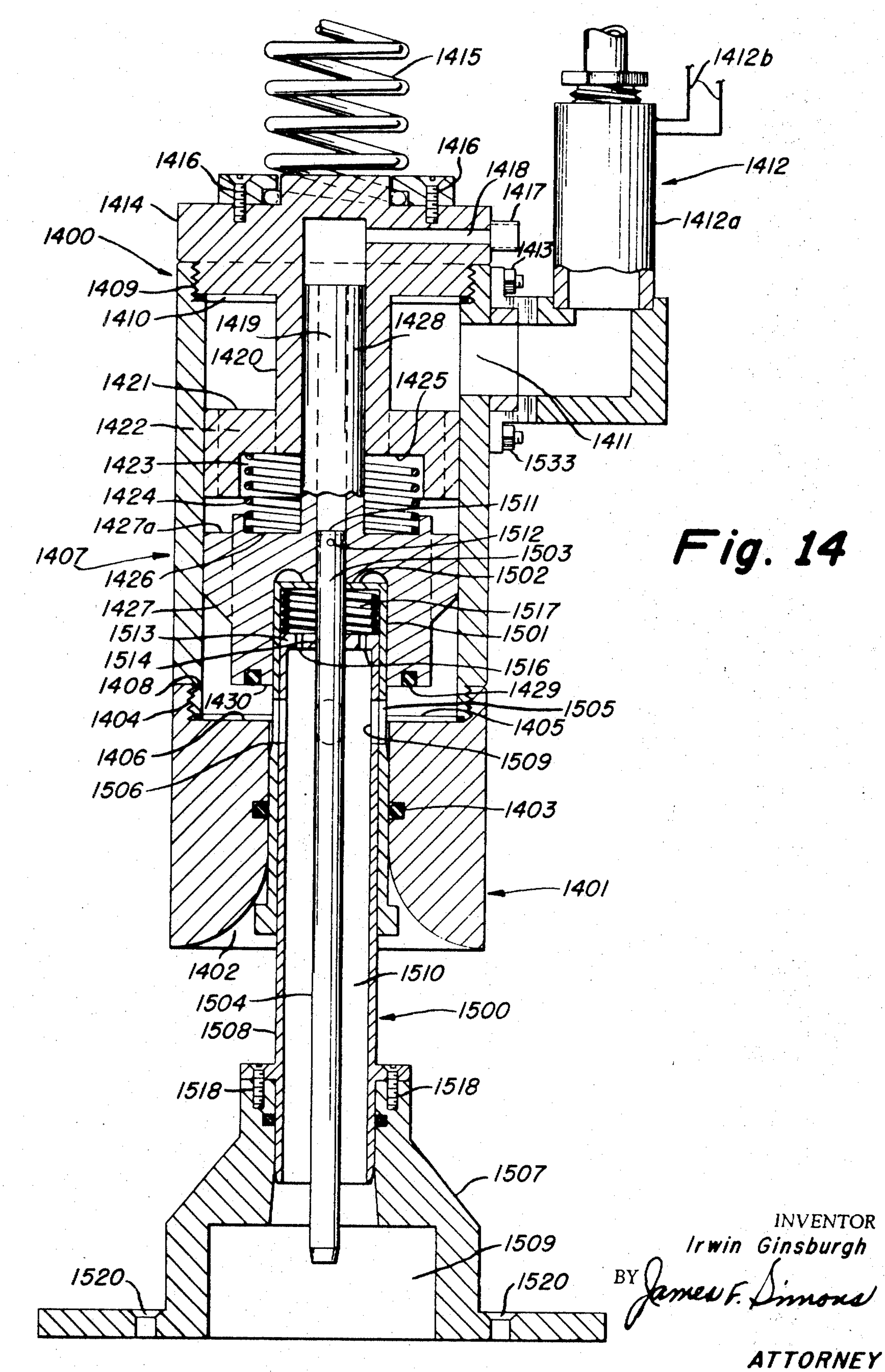

FIG. 14 is a sectional elevation view of the dispensing means and the vehicle mounted inlet means in the final communicating position shown in perspective in FIG. 13.

Figure 15:
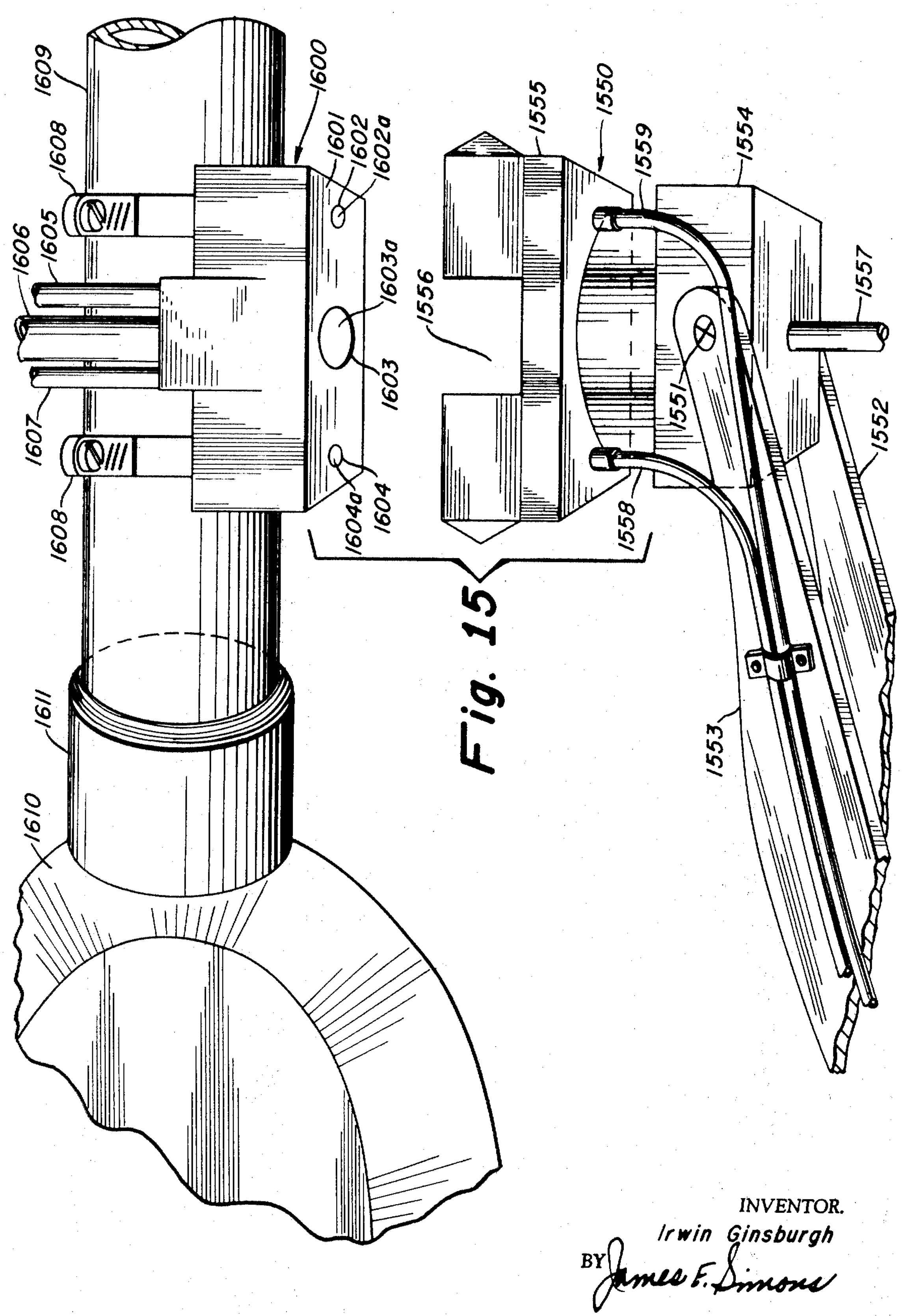

FIG. 15 is a perspective view of an embodiment of the dispensing head and the vehicle mounted inlet means.

Figure 16:
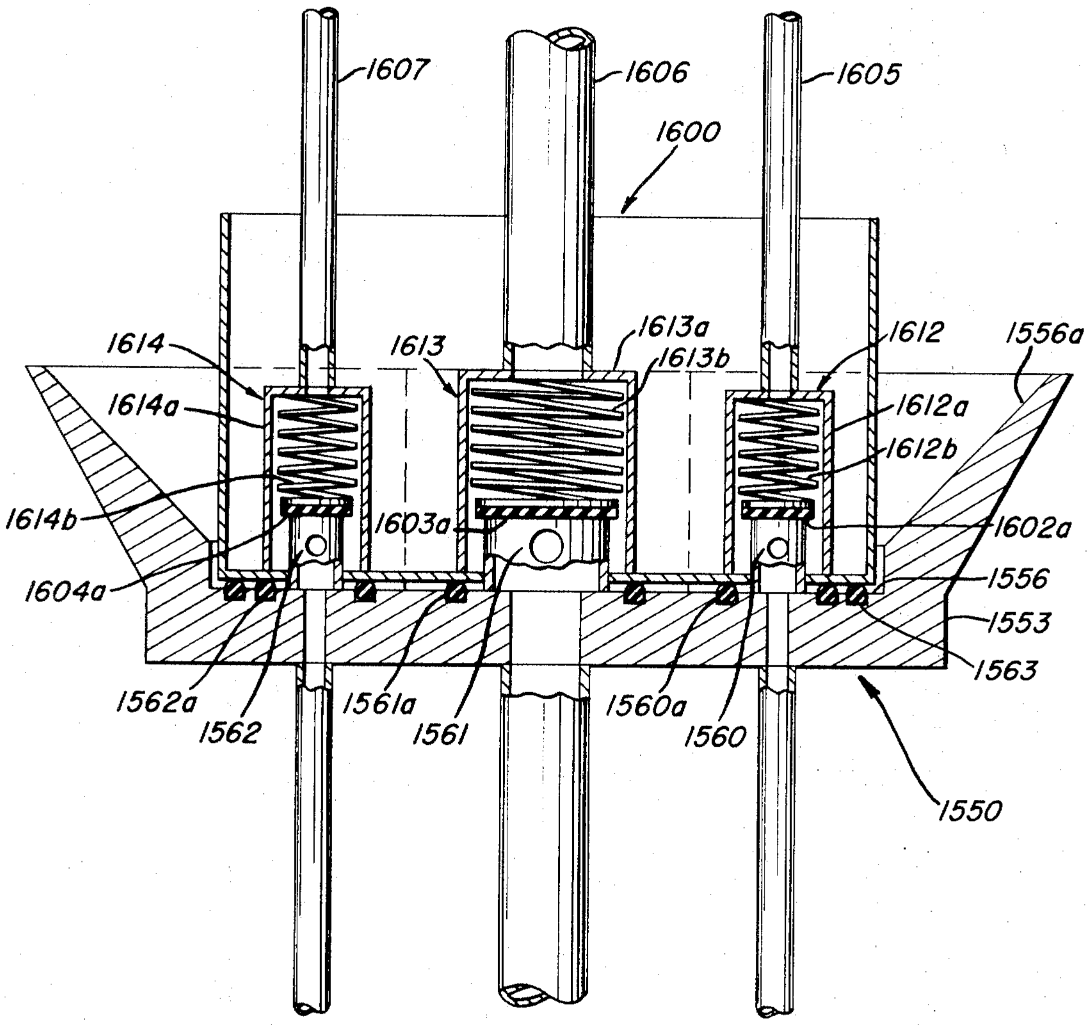

FIG. 16 is a sectional elevation view of the dispensing head and the vehicle mounted inlet means in the final communicating position shown in perspective in FIG. 15.

Throughout the figures, means for fastening (by screws, bolts, welds, etc.) together the various elements have been omitted for the sake of clarity and ease of understanding. Also, bearings have generally not been numbered, and in some instances not shown, their need and location being within the scope of established mechanical engineering skill.

Figure 1:
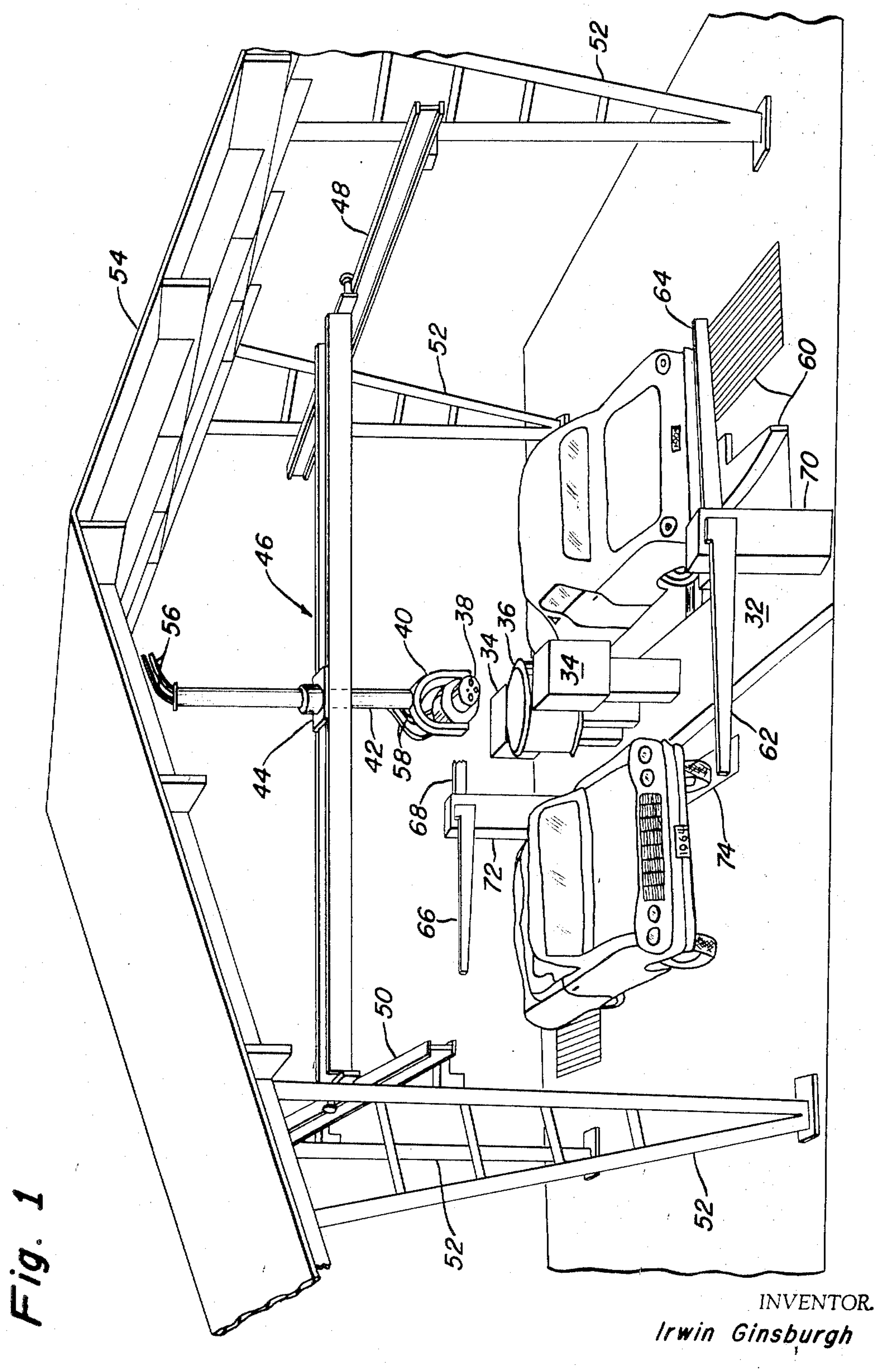

Previously described FIG. 1 discloses an over-all view of the dispensing apparatus, and does not require further description at this point. The elements of the system which are first used when an automobile approaches for refueling are lateral and longitudinal vehicle positioning means 60, shown in schematic plan view in FIG. 2A. Adjacent to island 32 is converging trough 202. At its entrance end, trough 202 has vertical sides 204. At its center, the trough has sloping sides 206, which are shown cross-hatched for clarity and which in lateral cross-section form a truncated V. The center portion of the base (or tire-bearing surface) of the trough forms, longitudinally, a shallow V, or notch, the apex of which is at line 208. When barriers 210 and 212 are disposed at each end of the shallow V portion and are adapted to be projected upward.

Figures 2A, 2B, 2C, 2D:
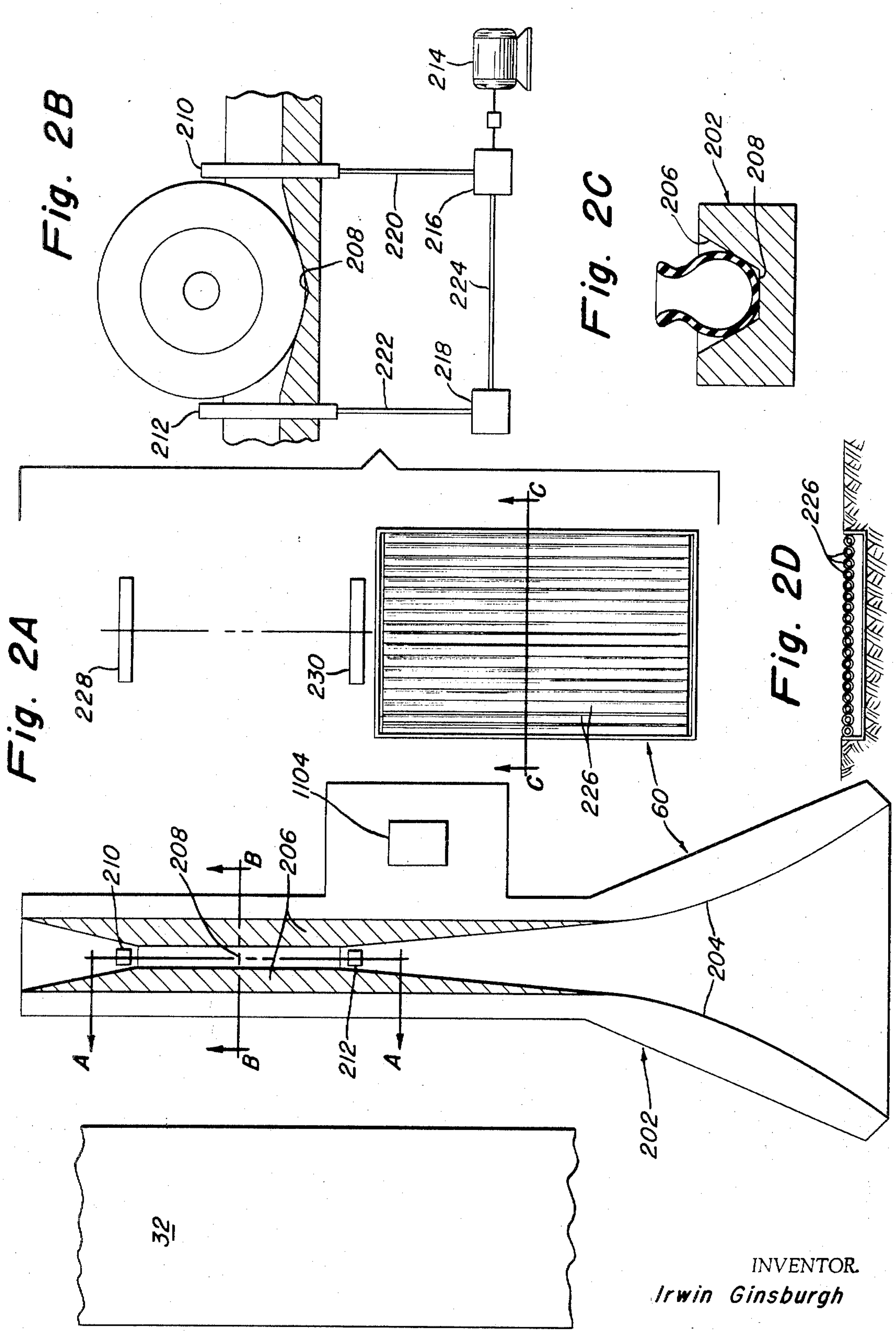

FIG. 2B is a schematic elevation view of section A—A of FIG 2A, and shows apex 208 of the shallow V as well as wheel barriers 210 and 212 projected upward above the bottom of trough 202, thus preventing movement of the wheel centered above the apex. Wheel barriers 210 and 212 are raised and lowered in response to operation of motor 214 through angle gear reducers 216 and 218 and screw jacks 220 and 222. The angle reducers are mechanically connected through linkage 224.

FIG. 2C is an elevation of section B—B from FIG. 2A, showing the sloping sides 206 and apex line 208 of trough 202. The outline of a section of a tire as it fits into the trough is illustrated schematically.

Returning now to FIG 2A, a plurality of long, thin rollers 226 are shown to the right of trough 202. Right-wheel barriers 228 and 230 are aligned opposite left-wheel barriers 210 and 212 and forward of rollers 226. A shallow V or notch for the right rear wheel may also be disposed between barriers 228 and 230 corresponding to the shallow V notch for the left rear wheel between barriers 210 and 212.

FIG. 2D is an elevation view of section C—C of FIG. 2A, and shows the plurality of rollers 226.

When an automobile drives in for refueling, its left front wheel is driven through trough 202 as the right front wheel passes over rollers 226. As the left front wheel enters trough 202, it is centered in the trough by means of converging sides 204, and further centered by means of sloping sides 206. Rollers 226 underneath the right front wheel permit the latter to move sideways in response to the compulsion exerted by sides 204 and 206 on the left front wheel. In a similar way, as the left rear wheel is centered in trough 202 the right rear wheel moves freely over rollers 226 in either direction as needed to align the automobile. Positioning of the automobile is completed when the left rear wheel is nestled in the V-shaped portion of trough 202, with the rear axle centered above apex line 208. As soon as the customer has initiated the refueling operation (as hereinafter described), wheel 210, 212, 228, and 230 are automatically projected upward to restrain movement of the automobile during refueling. Right wheel barriers 228 and 230 are wider than rear left wheel barriers 210 and 212 in order to accommodate the variations in track width of various types of automobiles.

Figure 3:
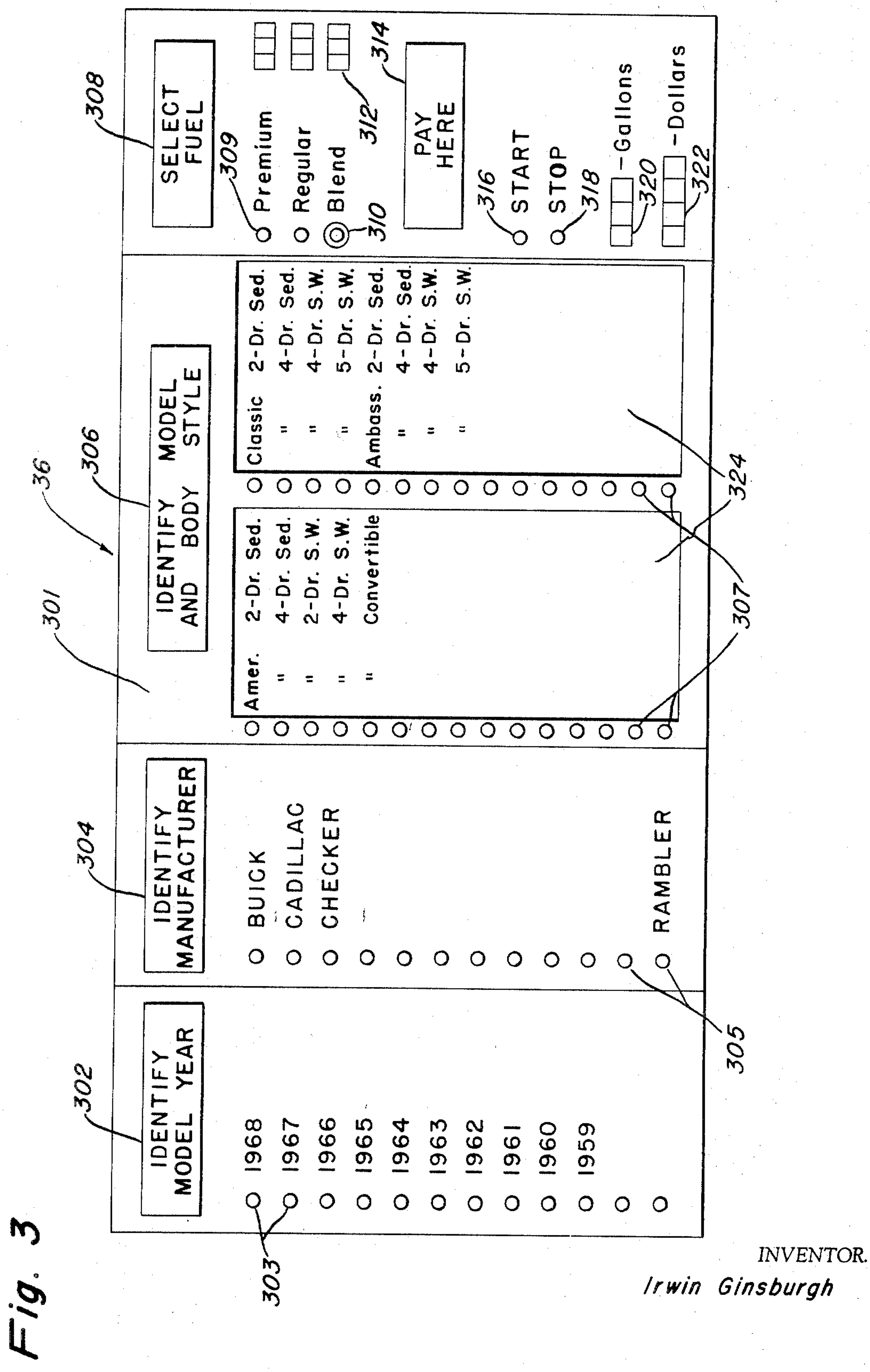

After the automobile has been positioned, the left front window opposite the console, convenient for the driver to exchange with the apparatus information relative to the automobile and amount of fuel desired. FIG. 3 illustrates a panoramic view of the face 301 of console 36. The console face is provided with a model year identification panel area 302 having a column of 10 or more push buttons 303 opposite which appear the numbers of the various automobile model years. The words "Identify Model Year" appear above this panel area. Adjacent to such panel area is a manufacturer identification panel area 304 having a column of push buttons 305 opposite which appear the names of the automobile manufacturers, e.g., Buick, Cadillac, Checker, etc. The remaining manufacturers' names have been omitted from FIG. 3 for the sake of convenience. The words "Identify Manufacturer" appear at the top of this panel area.

Moving to the right, FIG. 3 shows a model and body style selection panel area 306 which comprises two columns of push buttons 307 with which is associated the characterization of each model and body style of automobile of a given manufacturer which the apparatus is designed to refuel. The designations of such models and body styles will appear on a chart reel, rather like a scroll, underneath transparent windows 324 on panel area 306. The chart reel will have a block of model and body style designations for each manufacturer for each year. About 32 push buttons are necessary to characterize all the model designations for any one year period for the manufacturer currently having the greatest number of models. FIG. 3 shows the model designations for 1962 Ramblers. A plurality of model designations may be identified by one push button where each of such models has its fuel tank inlet in the same position, relative to the previously mentioned reference planes, and, hence, the same set of instructions in the stored program will properly refuel each such model.

Further to the right of the console panel, there is a fuel selection panel area 308 bearing push buttons 309 for the designation of either premium or regular grade gasoline, or a dial 310 for the selection of an intermediate blend of fuels. Opposite the fuel quality designation are windows 312 for displaying the price per gallon of the grades of fuel. In the center of the lower portion of the console, a payment means 314 for the insertion of money, bills and/or coins, or a credit card, is schematically shown whereby the customer arranges to pay for the fuel. Beneath payment means 314 is a start push button 316 and an emergency stop push button 318.

At the extreme lower right of the console is a porthole 320, behind which may be placed a counter which visibly shows the amount of fuel which has been pumped during any individual sale, and a porthole 322, behind which may be placed a counter showing the dollar value of the amount of fuel which has been pumped as shown through porthole 320.

As explained previously, the portion of the console bearing the model year, manufacturer, model and body style identification panels is rotatable in order that a driver of an automobile may operate all the necessary push buttons without leaving the driver's seat. The console may be rotated automatically as each bit of information is imparted by the driver, mechanically upon signal from the driver, or manually.

In operation, when an automobile is first positioned for refueling, the driver is presented with the model year and manufacturer identification panels 302 and 304 directly opposite the automobile window. The driver pushes the appropriate buttons on panels 302 and 304. The console then rotates to present model identification panel 306 to the driver. The driver then pushes the appropriate push button 307 identifying the model, and thereafter, in sequence selects the grade of fuel, inserts money or a credit card into payment means 314, and actuates start button 316. The sequence of operations which the automobile driver is to perform may be visually indicated to him by successively illuminating the panels or the legends on such panels, i.e., illuminating in succession the model year identification panel 302, manufacturer identification panel 304, model and body style panel 306, fuel grade panel 308, payment means mechanism 314, and start button 316.

It is to be understood that the sequence of information exchange between the driver and the console is a matter of design selection and is not critical; the first step in the sequence could be, for instance, the selection of the grade of fuel or the actuation of the payment means. Also, the provision on the console (or anywhere else) of a start button and an emergency stop button actuatable by the driver is optional. So also is the provision for displaying on the panel the amount and value of the fuel pumped. The arrangement shown in FIG. 3 of the console panel is illustrative, and many modifications of it are possible.

The push buttons 303 by which the driver identifies the model year are electrically connected to the stored program tape system. Pushing one of the buttons 303 starts the tape reading head hunting for that portion of the tape or tapes bearing the stored program instructions for automobiles of that particular model year. Pushing button 303 also actuates a chart reel driving means so that the appropriate chart sections for the year selected are advanced approximately into position for viewing. The push buttons 305 identifying the manufacturer are likewise electrically connected to the stored program tape system and to the chart reel driving means and may also be connected to a console rotation driving means. Pushing one such button concurrently starts the tape reading head searching for that portion of the tape which bears instructions for all such manufacturers' models in such particular year, further starts the chart reel driving means unrolling the chart reel to present to the driver the proper portion of the model and body style identification chart for such manufacturer for the particular model year previously selected and further may cause the console rotation driving means to rotate the console to present the model and body style identification panel opposite and within easy reach of the driver. If the sequence of operations is visually indicated by successive illumination of the panels, the pushing of a push button in one panel causes the illumination of the console face in which lie the push buttons to be pushed next by the driver.

After the necessary information has been supplied, dispensing head 38 is moved from its neutral position to a point adjacent the fuel tank inlet. This movement is effected by the combined operation of the elevator, bridge, and carriage.

Figures 4A, 4B, 4C, 4D:
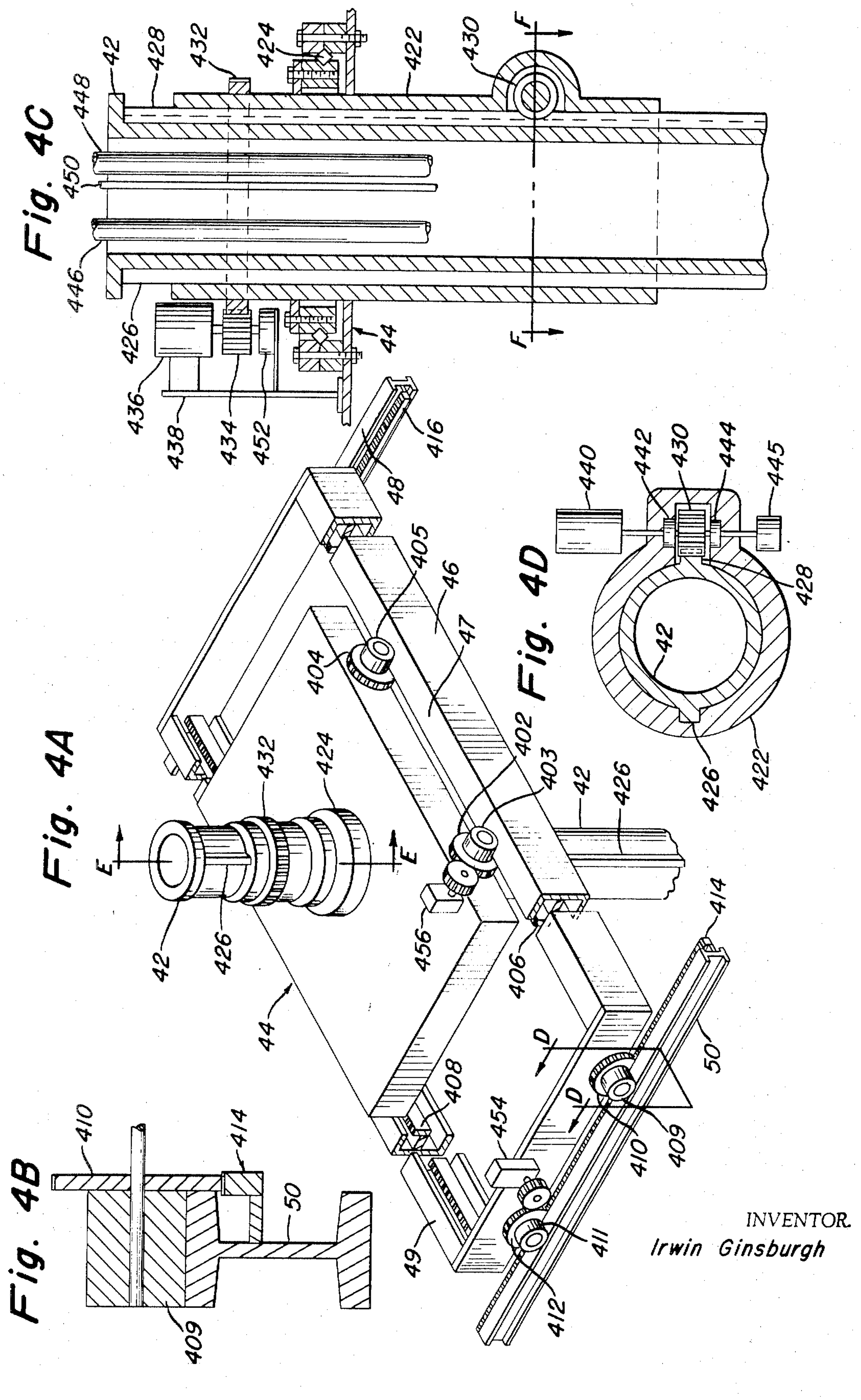

FIG. 4A illustrates in greater detail and in an isometric view bridge 46, crane rails 48 and 50, carriage 44, and the top part of elevator 42. Elevator 42 is rotatably carried by carriage 44. The carriage is equipped with pinion wheels 402 and 404 which engage driving rack 406 affixed to one cross member of bridge 46. The weight of carriage 44 is borne by support wheels bearing on bridge 46 as illustrated by support wheels 403 and 405 and bridge rail 47. Carriage 44 is driven back and forth across the bridge by a positioning motor (not shown) responsive to transverse transducer 456. Such positioning motor is connected by a positive drive mechanism to the axle of wheels 402 and 403. Carrige 44 is further supported and moved on bridge 46 by support and pinion wheels (not shown) mounted on the axles of wheels 402 and 404, and which engage rail 49 and driving rack 408 of the bridge.

Bridge 46 traverses along crane rails 48 and 50 supported by bridge support wheels 409 and 411 and driven by pinion wheels 410 and 412 which engage driving rack 414 mounted on crane rail 50. Similar support wheels and pinion wheels (not shown) engage rail 48 and guide rack 416. Bridge 46 is driven along the crane by means of a positioning motor (not shown) which is responsive to longitudinal transducer 454 and which engages through a positive drive mechanism the axle of pinion wheel 411. Other mechanisms for moving the carriage and the bridge could be used such as a linear electric motor, screw and nut mechanism, hydraulic and pneumatic cylinders.

Before completing the description of FIG. 4A, attention is directed to FIG. 4B which is a schematic vertical sectional view of section D—D of FIG. 4A and which shows the engagement pinion wheel 410 with rack 414 and support wheel 409 of crane rail 50. Pinion wheels 402, 404, 410, 412 and their counterparts (not shown) disposed at the end of their axles are all constructed the same; likewise, support wheels 403, 405, 409 and 411 may all be constructed the same. Similarly, bridge racks 406 and 408 and crane rail racks 414 and 416 may be constructed the same.

Elevator 42 is rotatably supported by carriage 44. The explanation of the rotation, and the raising and lowering, of the elevator 42 is most easily done in connection with FIG. 4C, which is a vertical sectional view of section E—E of FIG. 4A. Carriage 44 supports turntable 422 through X-bearing 424. The inner and outer races of X-bearing 424 are affixed, respectively, to turntable 422 and carriage 44. Elevator 42 is concentrically mounted within turntable 422 and is maintained in fixed rotational and vertical alignment therewith by key 426. Opposite key 426 is a rack 428 mounted on elevator 42 which engages the teeth of pinion 430 mounted on turntable 422.

Ring gear 432 mounted on turntable 422 engages pinion 434 driven by rotation motor 436 (shown in FIG. 4C but not in FIG. 4A) which is mounted on motor support 438 on carriage 44. Rotation transducer 452, which is directly connected to pinion 434, controls rotation of motor 436.

FIG. 4C also depicts fuel conduits 446 and 448 (to which lead hoses 56 of FIG. 1) and power conduit 450 disposed within elevator 42. For simplicity, these conduits are not shown in FIG. 4A or FIG. 4D.

FIG. 4D is a partial horizontal view of section F—F of FIG. 4C. It shows elevator 42, turntable 422, key 426, rack 428, pinion 430, and vertical transducer 445. Pinion 430 is driven by dispensing head vertical positioning motor 440 and is supported within turntable 422 by bearings 442 and 444. Vertical transducer 445 is connected to pinion 30; the function of transducer 445 is described hereinafter.

In operation, elevator 42 is rotated by motor 456 turning pinion 434 which, through its engagement with gear ring 432 on turntable 422 and key 426, causes elevator 42 to rotate with respect to carriage 44. Elevator 42 is moved vertically as a result of vertical positioning motor 440 turning pinion 430 which engages rack 428 of the elevator, thereby causing the latter to move upward or downward depending upon the direction of rotation of pinion 430. Key 426 acts as a guide to maintain proper alignment.

Figure 5A:
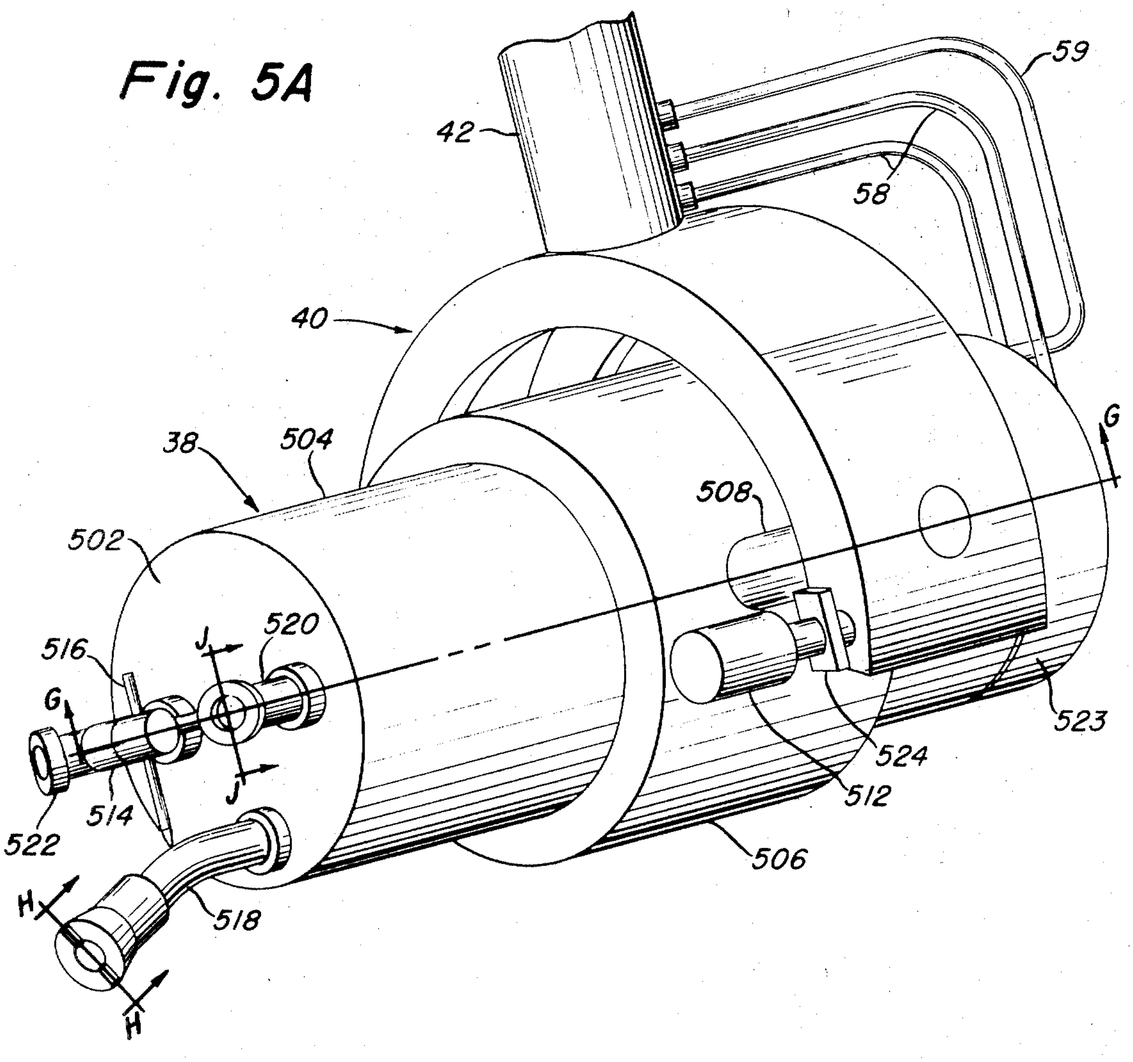
Figure 5B:
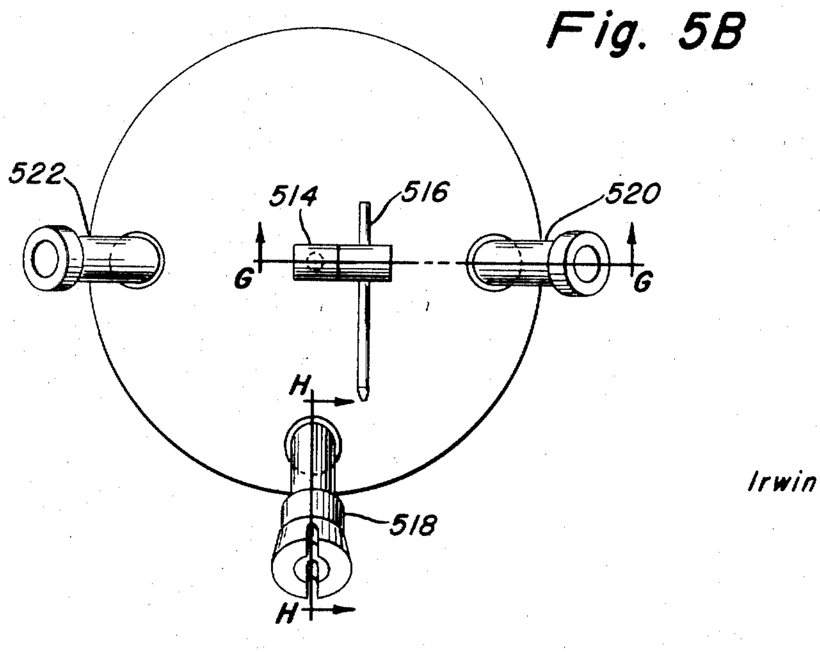

FIG. 5A is a schematic isometric close-up view of dispensing head 38, and FIG. 5B is a schematic plan view of face 502 of the dispensing head.

The dispensing head comprises a cylindical portion 504 within which are disposed the elements comprising the flap opening mechanism, the cap removal mechanism and the nozzle projection mechanisms. Cylindical portion 504 is carried within a cylindrical shell ring 506 within which is disposed, as hereinafter described, means for rotating cylindical body 504 about its longitudinal axis. Dispensing head 38 is carried by trunnions 508 (only one of which can be seen in FIG 5A) which are mounted in yoke 40. Trunnion rotation motor 412 is mounted on the side of the yoke 40 and engages trunnion 508 through a worm gear (not shown), thus permitting rotation of dispensing head 38 around the axis of the trunnions. The tilt angle of the dispensing head is indicated to the control system by tilt angel transducer 524. Yoke 40 is affixed to the bottom portion of elevator 42. As shown in FIG. 5A, yoke 40 has a semi-circular configuration; however, the yoke may be designed in the shape of a U, thereby permitting a greater angle of rotation of dispensing head 38 around the axis of the trunnions. Fuel hoses 58 and power cable 59 exist from elevator 42 at its base and pass through the rear of power pack 423 mounted on the rearside of cylindical body 504.

Extending outwardly from face 502 are flap opening knuckle 514, flap finger 516, cap remover arm 518 and fuel nozzles 520 and 522. These elements are further described in connection with the following sectional drawings.

Figure 6A:
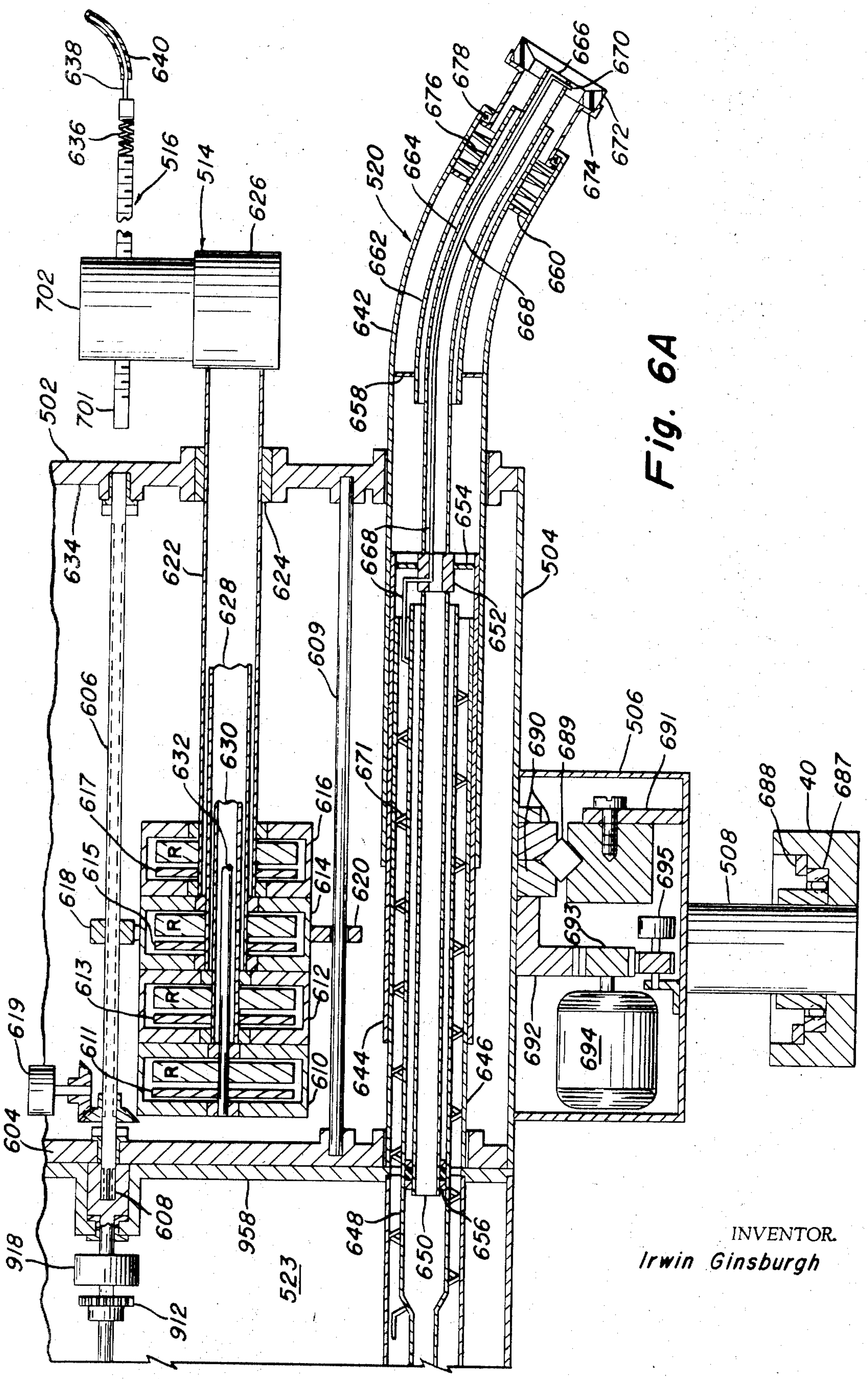

FIG. 6A is a partial sectional view taken alonge the longitudinal axis of the dispensing head at section G—G of FIG. 5A.

FIG. 6A shows face 502, cylindrical body 504, shell ring 506, yoke 40, knuckle 514, flap finger 516 and nozzle arm 520. To the left in this drawing is dispensing head internal support partition 604.

The flap opening mechanism appearing at the top of drawing 6A will be described first.

Figures 9A, 9B, 10:
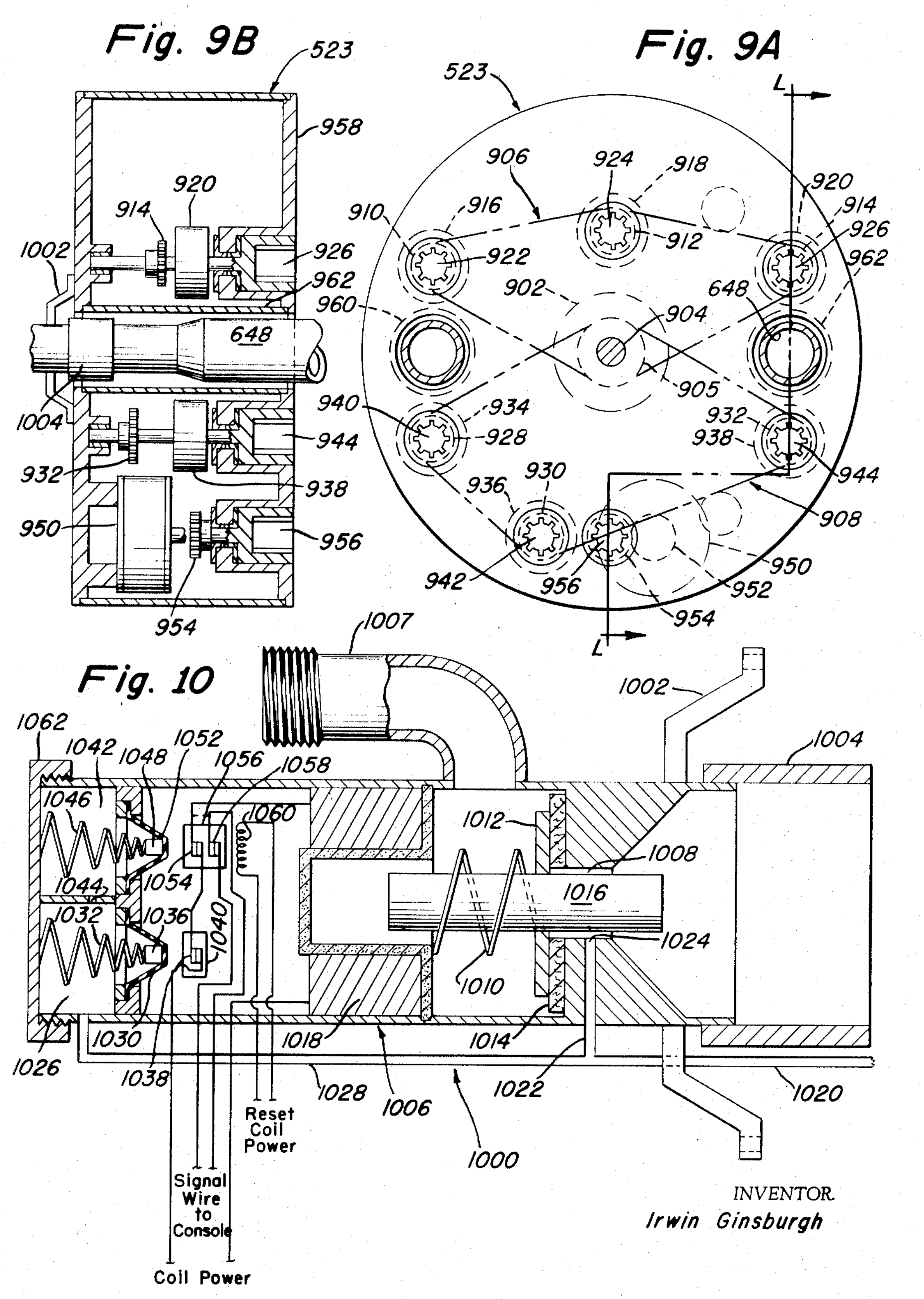
FIG. 9A is an elevational view of the power pack assembly illustrating the internal power transmission system.
FIG. 9B is a view of the power pack partly in section taken along lines L—L in FIG. 9A.
FIG. 10 is an enlarged detailed view of the gasoline control valve assembly partly in section.

Threaded rotatable upper screw 606 is supported by bearings in a recess in dispensing head face 502 and by a mearing in internal partition 604. Guide 609 is disposed in the face and partition. The left hand end 608 of screw 606 is splined and adopted to be mechanically connected to elements in the power pack section of the dispensing head, as shown in FIGS. 9A and 9B.

Four flat positioning motors 610, 612, 614, and 616 are mounted along a common rotational axis which is also advantageously the longitudinal axis of dispensing head 38. The motor housings are in fixed rotational alignment and supported by internally threaded nut 618 and bearing 620, which are carried by screw 606 and guide 609, respectively. The positioning motors have stators which are affixed to their respective motor housing and rotors (indicated by "R") which are affixed to hereinafter described shafts. Transducers 611, 613, 615 and 617 indicate to the control system the angular position of the rotors of motors 610, 612, 614 and 616, respectively.

Finger projection arm 622 is a sturdy tube freely rotatable in and supported by bearing 624 in face 502. Affixed to arm 622 at its outer end is hereinafter described lower knuckle housing 626. At its inner end, finger projection arm 622 carries the rotor of finger projection arm motor 616. Upper knuckle rotation shaft 628 is a cylindrical tube disposed within arm 622 and is affixed at its inner end to the rotor of knuckle rotation motor 614. Finger extension shaft 630 is a cylindrical tube disposed within shaft 628 and affixed at its inner end to the rotor of finger extension motor 612. Finger rotation shaft 632 is a rod disposed within tube 630 and affixed at its inner end to the rotor of finger rotation motor 610. Shaft 632 is shown as a solid element, but could be hollow.

Figure 7:
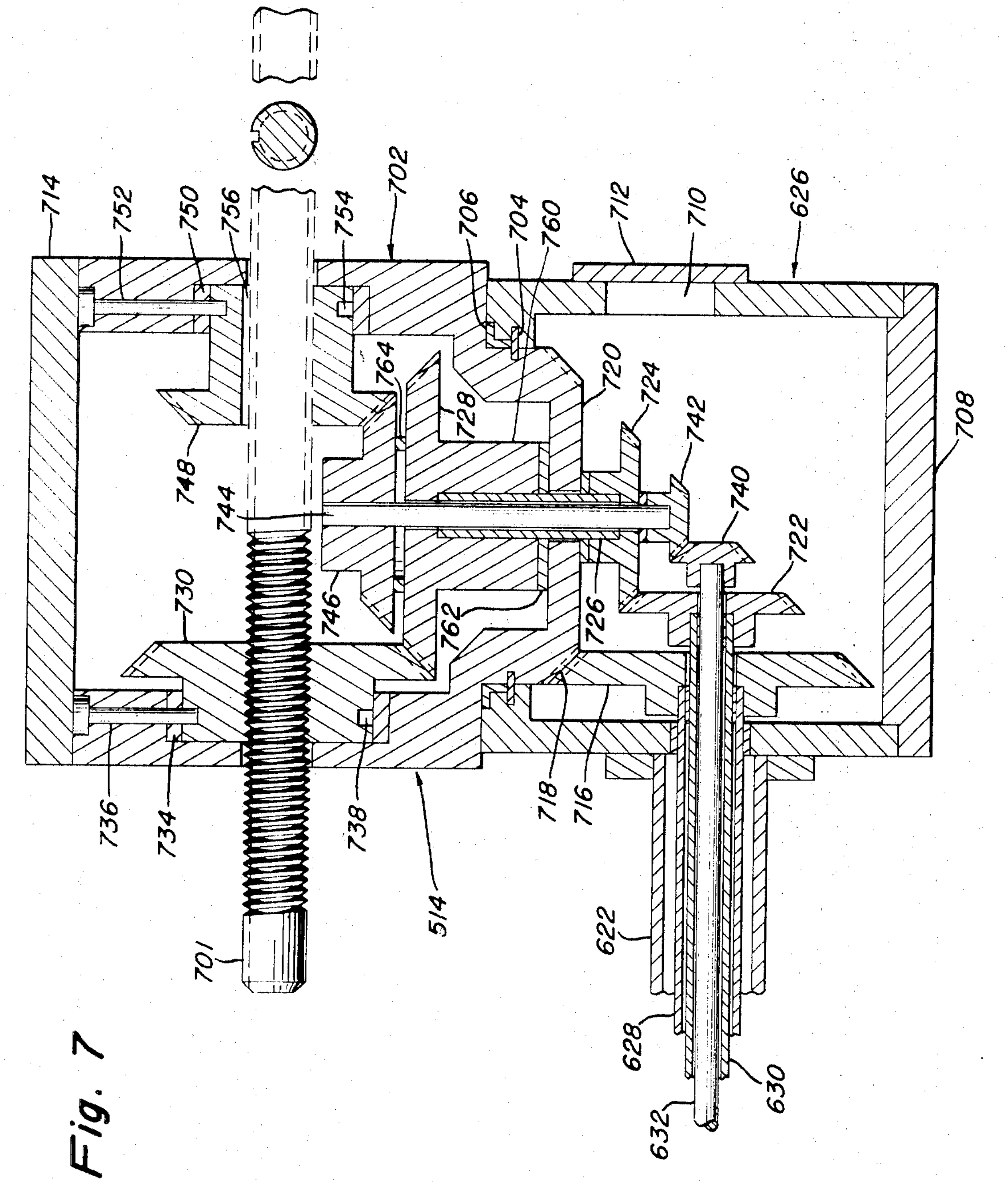
FIG. 7 is a sectional view of the flap opening knuckle taken in the plane formed by its rotational axis and the axis of its projection arm.

Elements 622, 628, 630 and 632 terminate at their outer end at or in knuckle 514 as further described in FIG. 7. All such elements have as their longitudinal axes the common rotational axis of the four positioning motors. Additional bearings (not shown) to maintain proper alignment between such elements may be installed in the plane of rotation of motor 616 or elsewhere as needed.

To extend the finger projection arm 622, screw 606 is rotated by driving means shown in FIG. 9A causing the motor housings to traverse toward the inside surface 634 of dispensing head face 502. This causes the four positioning motors and the four concentrically aligned shafts to move transversely, Because of this movement, the space between the inside surface 634 and the right hand side of motor 616 must be left free of obstruction. Retraction of the finger projection arm is done by simply reversing the direction of rotation of screw 606. The position of finger projection arm 622 is relayed to the control system by transducer 619.

Continuing with the description of the flap opening mechanism, FIG. 7 is a sectional view of knuckle 514 taken in the plane formed by its rotational axis and the axis of the finger projection arm 622. Finger projection arm 622 carries the knuckle and is affixed to the lower knuckle housing 626. Finger shaft 701 passes through upper knuckle housing 702. The upper knuckle housing is rotatably affixed to the lower knuckle housing 626 by means of retaining ring 704. Radial and thrust bearing 706 permits relative motion between the upper and lower knuckle housings. The lower knuckle housing has a bottoms cover 708, access port 710 and an access port cover 712. The upper knuckle housing has a top cover 714.

Upper knuckle rotation shaft 628 is affixed to gear 716 which engages, at line 718, the teeth of gear 720. Although gear 720 is shown cast as an integral part of upper knuckle housing 702, it is optionally a separate element and merely affixed to the upper knuckle housing.

Finger extension shafe 630 is affixed to gear 722 which engages gear 724. Shaft 726 is affixed to gear 724 and to gear 728, the latter engaging gear 730. Gear 730 is threadably engaged with finger shaft 701 and freely rotatably supported by bearing 734 in upper knuckle housing 702. Pin 736 fits into slot 738 on the hub of gear 730, thus permitting the gear to rotate, but restraining it from moving away from upper knuckle housing 702.

Finger rotation rod 632 is affixed to gear 740 which engages gear 742. Shaft 744, rotatably disposed within shaft 726, is affixed to gears 742 and 746, the latter being engaged with gear 748. The hub of gear 748 is freely rotatably supported by bearing 750 in a recess in upper knuckle housing 702. Pin 752, mounted within the upper knuckle housing, terminates in slot 754 cut into the hub of gear 748 and restrains such gear from moving away from the upper knuckle housing. The hub of gear 748 is provided with an internal key way 756. A counterpart key way is cut into finger shaft 701, and a key (not shown) prevents relative rotational movement between finger shaft 701 and gear 748, which is to say, rotation of gear 748 causes the finger shaft to rotate with it.

As shown in FIGURE 7, the hubs or collars on the various gears are shown as a single element with such gears. In practice, such hubs and collars could be integral with the shaft affixed to such gears, or they might be separate elements fastened with set screws to the shafts and gears. The gears are bevel gears and as shown have a 1:1 gear ratio. Alternative gear rations may be used depending upon design considerations of the knuckle and of the prime movers and mechanical linkages driving the knuckle's gears.

Pins 736 and 752 may be replaced if desired by retaining rings or other mechanical equivalents.

Hub 760 of gear 728 is extended downwardly and is supported by upper knuckle housing 702 through bearing 762. Gear 746, shaft 744 and gear 742 are supported by gear 728 and its hub through bearing 764.

Rotation of the upper knuckle housing is done by motor 614 rotating upper knuckle rotation shaft 628, which rotates gear 716 which in turn rotates gear 720 affixed to the upper housing.

Extension and retraction of the finger are done by the operation of the finger projection arm, as described in connection with FIGURE 6*A*, and finger extension shaft 630. Extension and retraction of the finger shaft 701 is done by rotating, using motor 612, finger extension shaft 630 which operates through gears 722 and 724, shaft 726, and gears 728 and 730. Rotation of gear 730, which is internaly threaded and threadably engaged with finger shaft 701 but restrained from other movement with finger shaft 701 by pin 736, transversely moves the finger shaft in a direction dependent upon the direction of rotation of the gear 730. Finger shaft 701 does not rotate with gear 730 because it is prevented from rotating by its keyed relationship to gear 748, which may be held in fixed position by use of motor 610 as a brake.

The rotation of finger shaft 701 is done by rotating, with motor 610, finger rotation shaft 632 which transmits its rotary motion through gears 740, 742 and 746 to gear 748. Since gear 748 is keyed to finger shaft 701, the rotation of the gear causes a corresponding rotation of the shaft. Finger shaft 701 and its rotational gear train may be designed for any desired number of degrees of rotation in either direction, illustratively, 180 or 360 degrees. It is to be noted that each 180 degrees of rotation of finger shaft 701 by gear 748 causes the finger shaft to move longitudinally a distance equal to ½ the pitch of the threads engaging the hub of gear 730. To compensate for this, the stored program may be written to use motor 612 to concurrently or sequentially rotate shaft 630 an amount sufficient to compensate.

Returning now to FIG. 6A for the description of the finger, threaded finger shaft 701 is shown passing through upper knuckle housing 702. At the end of finger shaft 701, there is a fixed stiff helical spring 636 to which is mounted a curved metal strip 638 covered with a non-scratching material 640. The pointed tip of strip 638 is that portion of the mechanism which contracts the flap during opening operation.

Figures 6B, 8:
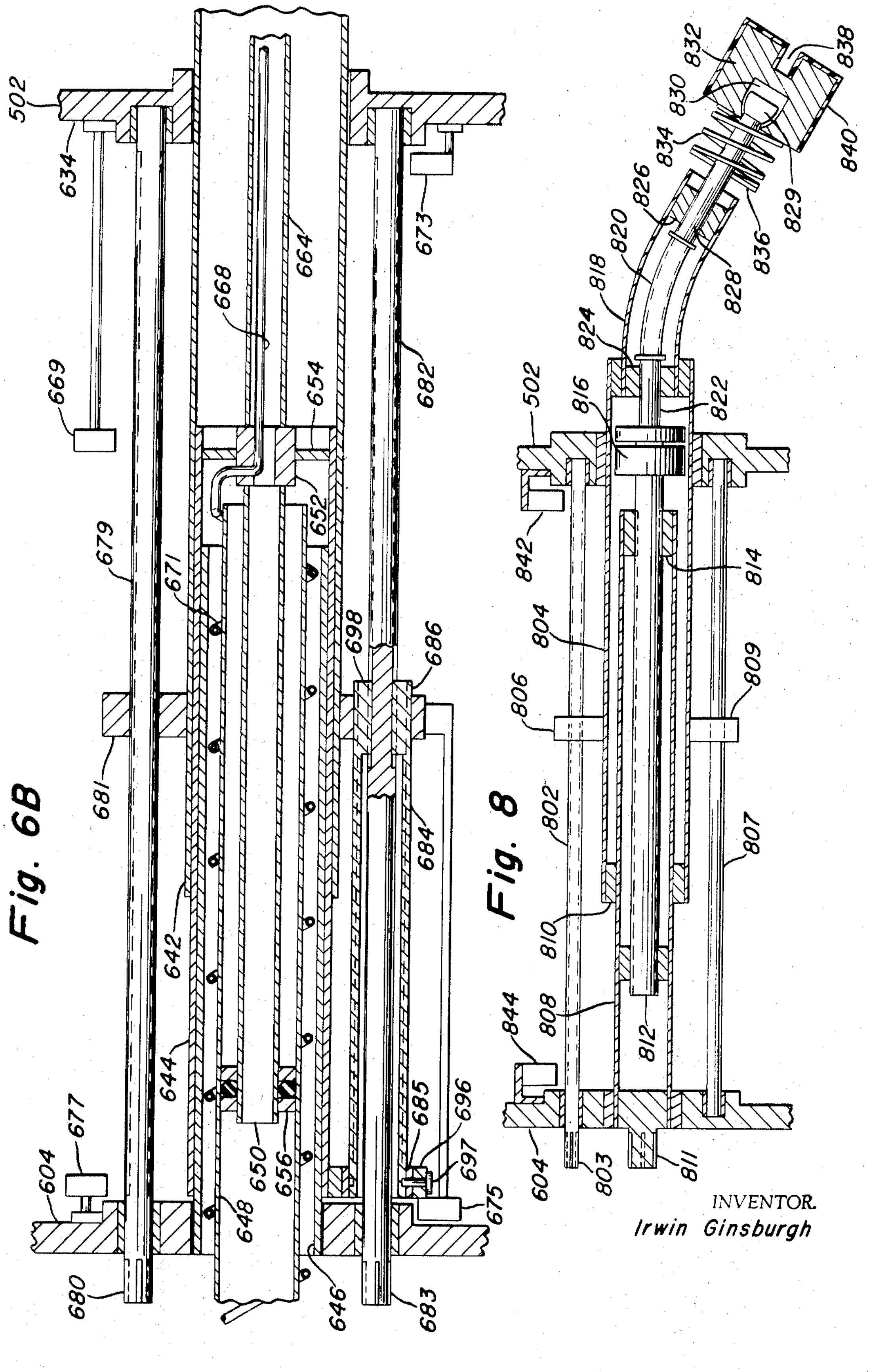
FIG. 8 is a partial longitudinal sectional view of the cap removal mechanism taken at section H—H of FIG. 5A, but with the curved outer end of such mechanism shown rotated 90 degrees for clarity of illustration.

After the flap has been opened, the cap remover arm is projected outwardly to remove the cap. FIG. 8 is a partial longitudinal section of the cap removal mechanism taken at section H—H (but also showing the curvature of the cap remover arm) of FIG. 5B. Threaded guide screw 802 is rotatably disposed in dispensing head face 502 and extends through support partition 604, ending in spline configuration 803 adapted to be engaged with its hereinafter described driving means. Cap remover projection arm 804 is a hollow tube, slideably extended through dispensing head face 502, and to it is affixed internally threaded nut 806 which threadably engages screw 802. Inside cap remover projection arm 804 is cap remover torque tube 808 which is maintained in concentric alignment with cap remover arm 804 by means of bearing 810. Torque tube 808 is rotatably extended through support partition 604 and terminates in a male spline 811 adapted for engagement with its driving means shown in FIG. 9. Concentrically mounted within torque tub 808 is splined shaft 812 which is held in fixed rotational alignment with torque tube 808 by means of the latter's female spline 814. Guide 807 is disposed between the dispensing head face 502 and support partition 604; bearing 809 is mounted on projection arm 804 and slideably engaged with guide 807.

The right hand side of splined shaft 812 carries slip and torque limiting clutch 816. The right hand portion of cap remover arm 804 comprises a section 818 of reduced cross-sectional area. Within such section is disposed flexible shaft 820 which is connected through shaft 822 to clutch 816. Bearings 824 and 826 are used to maintain proper alignment. At its outer end, flexible shaft 820 is affixed to solid shaft 828 which terminates in a relieved male spline 829 which fits into a female splined recess 830 in magnet 832. Flexibility to accommodate minor angular deviations when the cap remover is contacted with a gas cap is provided by coiled spring 834 held in place by collar 836 affixed to shaft 828. Permanent magnet 832 has a slot 838 and is covered with a non-abrasive, high surface friction material, such as rubber or polyurethane, 840.

In operation, cap remover 804 is projected forwardly by rotation of screw 802 until nut 806 contacts forward motion limit switch 842. During projection, torque tube 808 does not move, but splined shaft 812 is pulled along because of its mechanical linkage with section 818 and clutch 816. Dispensing head 38 (FIG. 5A) is positioned so that the gas cap is contacted by the face of magnet 832 a short time before limit switch 842 arrests forward motion of arm 804. Slight variations in the location of the gas cap are accommodated by the travel permitted by the play between magnet 832 and spline 829. Limit switch 842 also starts rotation of torque tube 808. Rotational tube 808. Rotational motion of tube 808 is transmitted through splined shaft 812 to magnet 832, thus permitting the magnet to first engage any tab on a gas cap, and thereafter to disengage the gas cap from the closure means on the fuel tank inlet pipe. Torque limiting clutch 816 prevents damage to the fuel tank inlet pipe or the cap removal mechanism by permitting slippage if and when the gas cap has been rotated against a stop means usually existing on fuel tank inlet pipes.

After the gas cap has been disengaged from the closure means, cap removal arm 804 is retracted by rotating screw 802 in a reverse direction, thus pulling the gas cap sufficiently far away to permit introduction of a nozzle into the inlet pipe. During this operation, the rotational alignment of torque tube 808 and splined shaft 812 are not changed.

The gas cap is replaced by projecting cap removal arm 804 as previously described, tightening the gas cap on the pipe by means of rotating torque tube 808 in the opposite direction from the removal action, and thereafter retracting cap removal arm 804. The rearward motion of arm 804 is stopped by limit switch 844 cutting power to the drive mechanism in the power pack hereinafter described.

Reference is again made to FIG. 6A, this time for a description of nozzle projection mechanism 520. Primary nozzle projection arm 642 is slideably disposed through and carried by dispensing head cover 502. It is a straight tube throughout its left hand (or inner) end, and partially curved towards its right hand or outer end. Secondary nozzle projection arm 644 is telescopically disposed within primary projection arm 642. Vent tube 646 is telescopically disposed within secondary projection arm 644, and passes through and is carried by internal partition 604.

Fixed fuel conduit 648 is concentrically disposed within vent tube 646 and extends, as shown on FIG. 6A, to the left through the hereinafter described power pack housing to connect with a gasoline control valve assembly hereinafter described. Movable fuel conduit 650 is concentrically disposed within outer fuel conduit 648, and at its right hand end is affixed to and carried by collar 652, which in turn is affixed to the inside of secondary projection arm 644 by first spider 654. Passage of fuel through the annular space between fuel conduits 648 and 650 is prevented by slideable seal means 656, which also acts as a support for the left hand end of inner fuel conduit 650. (An alternative embodiment is to make fuel conduits 648 and 650 telescopic, with a tightness of fit and enough over-lap to prevent leakage of fuel between the two conduits.)

Second spider 658 and third spider 660 are affixed to the inside of primary nozzle projection arm 642 and carry nozzle guide 662. Disposed within nozzle guide 662 is fuel nozzle 664, which comprises a flexible center portion, and terminating in a mouth 666. Nozzle 664 connects to and is primarily carried by collar 652, and is not supported at its mouth.

Snifter tube 668 extends from its open end 670 located on the side of and adjacent mouth 666 of fuel nozzle 664 back through the nozzle, through collar 652 and, in the form of an easily extendible helical coil 671, back through the annular space between vent tube 646 and fixed fuel conduit 648. It terminates at its left end (not shown on FIG. 6A) in the automatic fuel flow control means. Except for its helically coiled portion, snifter tube 668 is similar in construction and disposition at mouth 666 of the fuel nozzle 664 to conventionally used snifter tubes; however, the automatic fuel control means to which it leads may be the same or different from such means now in use.

Ring gasket 672 is carried by collar 674 which in turn is carried by outer projection arm 642. Seal 672 is in the shape of a ring, with an inwardly sloping outer surface. It is made of an oil-resistant, easily deformable material (e.g., sponge neoprene rubber) in order that it form a fluid-tight seal around the mouth of the fuel tank inlet. Spring 676 provides sufficient resiliency to permit seal 672 to accommodate slight inaccuracies in the angle at which it is presented to the mouth of the fuel tank inlet, and further provides sufficient tension to maintain the alignment between collar 674 and outer projection arm 642. Collar seal 678 prevents the escape of fuel which may back-up into the primary projection arm 642 during the fueling operation.

Before describing the movements of the nozzle projection mechanism, it is necessary to refer to FIG. 6B, which is a partial sectional view of the outer portion of such mechanism taken along the longitudinal axis of dispensing head 38 at section J—J of FIG. 5A. (The section shown in FIG. 6B is taken perpendicular to the section shown in FIG. 6A.) Externally threaded rotatable screw 679 is supported by a bearing in a recess in dispensing head face 502 and by a bearing in internal partition 604. Screw 679 is provided with a male spline 680 at its left hand driven end. Internally threaded nut 681 engages the threads of screw 679 and is affixed to primary projection arm 642.

Guide and torque spline 682 is rotatably supported by a bearing in a recess in dispensing head cover 502 and by a bearing at the point where it passes through internal partition 604. The male spline configuration extends along almost the entire length of guide spline 682 between cover 502 and partition 604. The left hand end 683 of spline 682 extends into the power pack section at the rear of the dispensing head where it engages its driving means. Secondary projection arm torque tube 684 is externally threaded, and is provided with a female-splined internal collar 698 (here shown integral with the torque tube) at the forward end; this collar slideably engages spline 682 and holds torque tube 684 in rotational alignment with spline 682. At the left hand end of the torque tube, bearing 685 is carried by yoke 696 and held in the yoke 696 by retaining pin 697. Yoke 696 is mounted on secondary nozzle projection arm 644. Internally threaded nut 686 is threadably engaged with the outside threads of tube 684 and is affixed to primary nozzle projection arm 642. (Nuts 681 and 686 are separate elements, despite the fact that they are shown in vertical alignment in FIG. 6B.)

Referring now to both FIGS. 6A and 6B. When refueling a car the nozzle is projected into the fuel tank inlet pipe in response to the stored program instructions for the model of automobile being refueled. Primary projection arm 642 is first extended by the rotation of screw 679, the rotation of which, acting through nut 681, outwardly projects arm 642 until ring seal 672 encounters and fits over the mouth of the fuel tank inlet pipe. At the same time, secondary projection arm 644 is carried outwardly (that is, to the right) an equal distance as a result of the mechanical linkage formed between it and primary projection arm 642 by nut 686, torque tube 684 (sliding along spline 682) and bearing 685. All of the elements (spider 654, collar 652, fuel nozzle 664, snifter tube 668, and movable conduit 650) are carried by the secondary projection arm 644, and all the elements (second spider 658, third spider 660, nozzle guide 662 and the extremity elements, Nos. 672, 674, 676 and 678) are carried by the primary projection arm 642 and likewise projected forward concurrently. Vent tube 646 does not project.

Dispensing head 38 (FIG. 5A) is so positioned that after ring gasket 672 encounters and fits over the fuel tank inlet pipe mouth, forward motion limit switch 669 has stopped the motion of primary projection arm 642 by disengaging screw 679 from its driving means. Next, spline 682 is rotationally engaged with its driving means. Spline 682 causes torque tube 684 to rotate and, because of its threaded engagement with nut 686, to move outwardly. Secondary projection arm 644 telescopically slides between vent tube 646 and non-stationary primary projection arm 642 until forward movement limit switch 673 stops arm 644, thus projecting mouth 666 of nozzle 664 several inches (illustratively, six to eight inches) into the fuel tank inlet pipe.

Upon completion of the foregoing projection, pumping of fuel is automatically started. After the required quantity of fuel has been pumped, the nozzle projection mechanism is retracted by reversing the projection procedure. However, in this case rear movement limit switches 675 and 677 stop the movement of arms 644 and 742 respectively.

Although the foregoing description was in respect of only one of the two nozzle projection mechanisms, its counterpart mechanism is constructed and operated in the same manner; they are, in effect, "twins."

The arrangement between yoke 40, shell ring 506 and dispensing head body 504 is depicted at the bottom of FIG. 6A. Trunnion 508 is rotatably supported by means of bearing 687 held in place by collar 688, and is affixed to shell ring 506. (As described previously, one trunnion is rotated by trunnion motor 512 by means of a worm gear arrangement, not shown in FIG. 6A. Rotation of the trunnions rotates ("tilts") dispensing head 38 around the axis of the trunnions.) Shell ring 506 encircles dispensing head body 504, and rotatably carries it by means of X-bearing 689, the split inner races 690 of which are affixed to body 504, and the outer race of which is carried through mounting support 691 by shell ring 506. Ring gear 692 is affixed to dispensing head body 504, and engages pinion gear 693 driven by dispensing head rotation motor 694 which is supported by means not shown by shell ring 506. Actuation of motor 694 causes dispensing head 38 to rotate around its longitudinal axis, and the angle of rotation of head 38 is indicated to the control system by transducer 695.

It will be noted that dispensing head 38 is rotatable around three axes. It is rotated around a vertical axis by operation of elevator rotation motor 436 (FIG. 4C). This capability is required to present the dispensing head to fuel tank inlets which do not point toward the left side of an automobile. The dispensing head may also be rotated around the axis of the trunnions, using trunnion rotation motor 512 (FIG. 5A), in order to accommodate the varying angles (relative to a horizontal plane) at which fuel tank inlets are positioned; generally, such inlets point sharply upward. Finally, the dispensing head is rotatable around its own longitudinal axis by operation of dispensing head rotation motor 694. This capability may at times be needed to present the cap removal mechanism in proper position relative to the fuel tank inlet, and is needed after the gas cap has been removed and while the flap opening mechanism is holding the flap open in order to present one of the nozzle projection mechanisms in proper position. It is because of the need to rotate the dispensing head around its longitudinal axis while concurrently holding open the flap that the longitudinal axis of finger projection arm 622 is designed to coincide with the longitudinal axis of dispensing head 38. The flap may be held open, and knuckle 514 and flap opening finger 516 held stationary in space, by rotating finger projection arm 622 in a direction opposite to and at the same angular speed as the longitudinal rotation of dispensing head 38.

FIGS. 9A and 9B are views of the previously mentioned power pack assembly 523; this assembly provides power to project and retract the fuel nozzles, the cap remover and the flap opening mechanism and to rotate the cap remover magnet on the dispensing head 38. FIG. 9A is an elevational view of the power pack assembly depicting the internal power transmission system. FIG. 9B is a view of the power pack assembly partly in section taken along line L—L in FIG. 9A. As previously shown in FIG. 5A, the power pack assembly 523 is mounted on the back of head 38. Preferably, the power pack assembly 523 is a separate unit so that it may be easily removed for any needed servicing. In operative position, the front wall 958 of the power pack assembly 523 is mounted adjacent to the dispensing head internal support partition 604 (FIG. 6A).

Referring to both FIG. 9A and FIG. 9B, positioning motor 902 turns drive shaft 904. Drive chain 906 is fitted over drive chain sprocket 905, mounted on shaft 904, and drive chain sprockets 910, 912 and 914. Sprockets 910, 912 and 914 are coupled to electromagnetic clutches 916, 918 and 920, respectively, with drive internal splines 922, 924 and 926, respectively. Drive chain 908 is fitted over a second drive chain sprocket (not shown), mounted on shaft 904, and drive chain sprockets 928, 930 and 932. Sprockets 928, 930 and 932 are coupled to electromagnetic clutches 934, 936 and 938, respectively, which drive internal splines 940, 942 and 944, respectively.

Spline 926 receives external spline 680 (FIG. 6B) on primary nozzle projection arm 642. Spline 922 similarly receives the external spline on a second primary nozzle projection arm which is a component of fuel nozzle 522 shown in FIG. 5A. Spline 924 drives external spline 608 (FIG. 6A) of the flap opener projection arm 622. Spline 944 drives external spline 683 (FIG. 6B) on the secondary nozzle projection arm 644, and spline 940 drives a second secondary nozzle projection arm (not shown) of fuel nozzle 522. Spline 942 drives spline 803 (FIG. 8) on the cap remover arm. These splines are driven by their corresponding electromagnetic clutches in response to signals from the control system.

A second positioning motor 950 drives pinion 952 and gear 954. Gear 954 is connected to internal spline 956 which drives spline 811 of FIG. 8 to rotate the cap remover magnet 832. Rotation is controlled by switching motor 950 on and off in response to instructions from the program.

Passageway 962 is an extension of vent tube 646 of fuel nozzle 520 and also receives fixed fuel conduit 648 (FIG. 6A), which extends through the passageway and connects with the fuel control asembly next to be described. The annular space between the conduit 648 and the walls of passageway 962 conduct the fuel vapors from the fueling operation and pass them to the atmosphere at the rear of the power pack assembly 523. Alternatively, the vapors can be pressed to a vapor recovery system. Power control valve assembly 1000, which will be described in detail in FIG. 10, is mounted on the back of the power pack assembly with mounting lugs 1002. A second fuel control valve (not shown) is also mounted on the back of the assembly 523 in register with passageway 960.

FIG. 10 is a detailed view partly in section of fuel control valve assembly 1000. It mounts on the back of power pack assembly 523 by means of mounting lugs 1002. A liquid tight coupling 1004 connects the housing 1006 of assembly 1000 to the fixed fuel conduit 648 (FIG 6A).

Valve assembly 1000 is shown in the closed position. Plate 1012 and magnetic plunger 1016, which are firmly joined together, obstruct orifice 1008. The action of spring 1010 causes plate 1012 to compress gasket 1014 and achieve a leakproof fit.

Valve assembly 1000 is electrically operated. When electric power is applied to coil 1018, magnetic plunger 1016 moves to the left in FIG. 10. Movement of plunger 1016 and plate 1012 to the left unblocks the orifice, thereby opening the valve.

When control valve assembly 1000 is in the open position fuel enters the control valve through inlet connection 1007, flows through the space between plate 1012 and gasket 1014, passes through control orifice 1008 and through coupling 1004 into fixed fuel conduit 648. The control valve is closed by removing power to coil 1018. This occurs when a preselected quantity of fuel has been delivered to the automobile being refueled or the fuel tank has been filled, whichever event the driver has selected.

Valve assembly 1000 closes automatically when the fuel tank of the automobile is full by sensing with snifter tube 668 that the fuel has risen to the level of the open end of the filling nozzle. As shown in FIG. 6A, snifter tube 668 extends from its open end 670 located on the side of and adjacent mouth 666 at fuel nozzle 664 back through the nozzle and connects with helical section 671 which in turn connects with front snifter tube extension 1020 of valve assembly 1000. Extension 1020 connects through passage 1022 to port 1024 in the control orifice 1008. When fuel flows through the control orifices, the pressure at port 1024 is below atmospheric. Because of the lower pressure, air and other gases from within the fuel tank inlet are drawn into the flowing fuel through port 1024, connecting passage 1022, snifter tube extension 1020, helical snifter tube 671, nozzle snifter tube 668 and the open end 670 of snifter tube 668. If the fuel level in the fuel tank inlet is high enough so that fuel foam obstructs the open end of snifter tube 670, air and gases are no longer drawn into the snifter tube assembly. The lower pressure caused by the flow of fuel at orifice 1008 creates a vacuum in back snifter tube extension 1028 and evacuates first diaphragm chamber 1026. As first diaphragm chamber 1026 is evacuated, diaphragm 1030, which is held extended by spring 1032, is drawn into chamber 1026 forcing small permanent magnet 1036 (affixed to spring 1032) to the left. As magnet 1036 moves to the left, it exerts magnetic pull on contact 1038 of hermetically sealed reed switch 1040 and ultimately pulls the reed switch contacts apart. The opening of the reed switch stops the flow of current to coil 1018 which releases the magnetic plunger 1016 and seats plate 1012 against the gasket 1014 thereby closing the valve and stopping the flow of fuel. In the event that fuel or foam is only temporarily blocking open end 670 of the snifter tube 668 due, for example, to splashing of the fuel, the subsequent unblocking of the open end of snifter tube 670 permits air to flow into the snifter tube assembly and repressure diaphragm chamber 1026. This permits spring 1032 to push magnet 1036 to the right and the closing of reed switch 1040 permits the coil 1018 to again open the control valve and permits fuel to flow. This reopening prevents premature termination of the refueling operation due to temporary blocking of the open end of the snifter tube 670 and can be repeated as many times as necessary.

When the level of fuel in the automobile tank or inlet pipe reaches the open end of the snifter tube 670, the open end 670 of the snifter tube 668 is completely blocked and the components of the fuel control valve function as heretofore described under a temporary blocking of the open end of the snifter tube 670. However, this time the open end of the snifter tube is not unblocked and the valve must not reopen. The reduced pressure in diaphragm chamber 1026 slowly evacuates second diaphragm chamber 1042 through the very small orifice 1044. The resultant action of spring 1046, magnet 1048 and diaphragm 1052 of chamber 1042 is the same as the action of the identical components of chamber 1026. This time one of the contacts 1054 of hermetically sealed latching-type reed switch 1056 is pulled open. The open contacts 1054 remain open and keep the control valve closed during the rest of the operation. A second pair of contacts 1058, mechanically coupled to contacts 1054, can be used to indicate to the control system that reed switch 1056 is open and therefore the automobile's fuel tank is full. A reset coil 1060 is used to unlatch reed switch 1056 at the start of the next filling operation.

A rear cover cap 1062 permits access to the two diaphragm chambers.

In this embodiment, two separate fuel valves and nozzle assemblies are shown. A single valve that can select either type of fuel and deliver it through one nozzle assembly can also be utilized.

Earlier in the specification reference was made to the variable vertical vehicle position determining means, which is required because the vertical distance above grade of the fuel tank inlet varies from automobile to automobile, even though they may be identical models. The variation in such distance results from variations in the condition of the vehicle's tires and rear springs and the loads (passengers, luggage and fuel) on the tires and springs. Because the addition of the fuel alone will alter such distance during the refueling operation, it is necessary, as previously described, to provide for initially sensing the elevation of each vehicle above a known datum plane, in order that the dispensing head be correctly positioned initially relative to the mouth of the fuel tank inlet, and further to provide means for continuously sensing such elevation during the refueling operation, and adjusting the vertical position of the dispensing head in response thereto.

Figure 11:
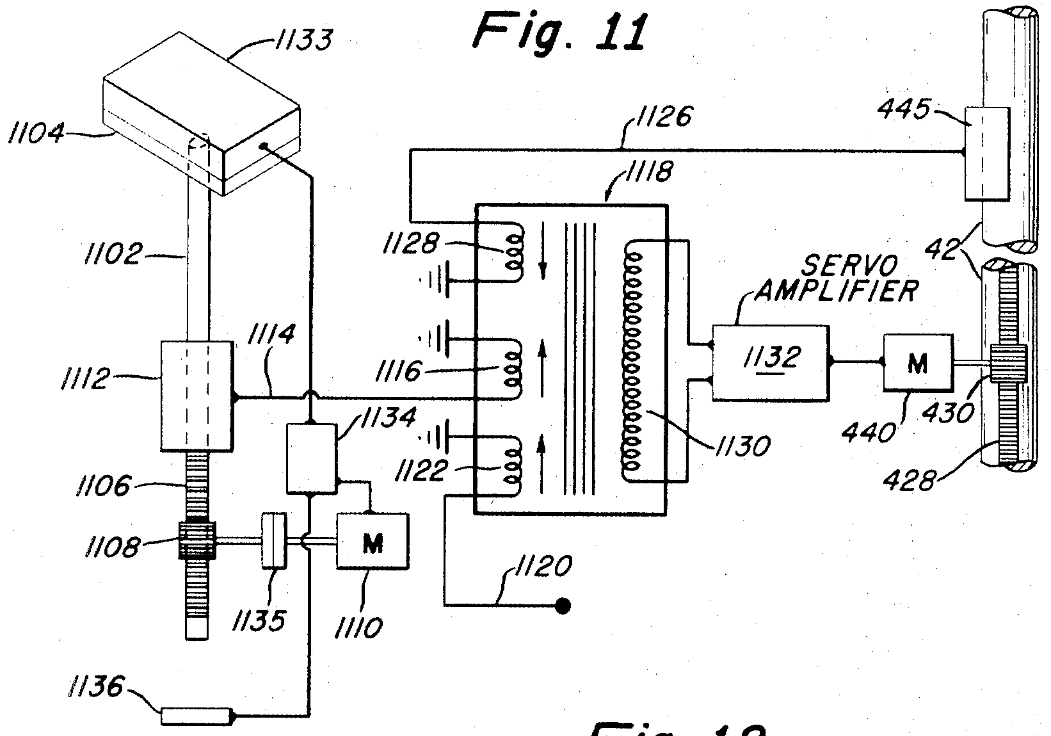
FIG. 11 is a schematic diagram of the mechanical elements and circuitry of the variable vertical position determining means.

The apparatus for such sensing was earlier described. The electrical circuitry and the primary mechanical elements comprising the variable vertical position determining means are shown schematically in FIG. 11. Variable vertical position determining probe 1102 carries a horizontal support plate 1104 (shown isometrically), also shown on FIG. 2, with a pressure sensitive switch 1133 on its upper surface. Pressure sensitive switch 1133 detects the pressure of any contact made on its upper surface. In operation, plate 1104 and switch 1133 are raised by rack 1106 until switch 1133 contacts some point on the underside of the automobile. Rack 1106 is driven through pinion 1108 by vertical probe motor 1110. Contact of switch 1133 with the underside of the automobile signals motor control relay 1134 to stop motor 1110. Friction clutch 1135 allows probe 1102 to descend as the automobile descends with any increase in its load. Variable vertical position determining probe transducer 1112 (which is a linear variable differential transformer acting as a transducer) is disposed around probe 1102 and adapted to continuously electrically signal (alternating current) the distance such probe is extended upwardly from a datum plane. Such signal is transmitted through line 1114 to first primary winding 1116 of transformer 1118.

The vertical distance between the mouth of the fuel tank inlet and the obstructing point on the underside of the vehicle (which point is sensed by probe 1102) is constant for each model or vehicle, and is represented by a constant intensity electrical signal generated (by means not shown) upon instruction by the stored program for such model and transmitted through line 1120 to second primary winding 1122.

Elevator-elevation measuring transducer 445 is disposed adjacent elevator 42 and is adapted to measure the vertical distance between the reference datum plane and the axis of the trunnions of yoke 40, and to transmit through line 1126 a signal proportioned to such distance. The signal transmitted through line 1126 leads to third primary winding 1128.

(Elevator transducer 445 measures the distance to the trunnion axis, rather than to some point on dispensing head cover 502, because the dispensing head is rotatable about the trunnion axis and, hence, the center of cover 502 may, and often will, be above or below such axis. To accommodate the latter event, the magnitude of the signal transmitted to primary winding 1122 is varied by the stored program as the dispensing head is so rotated, or is automaticarly varied by electro-mechanical means (not shown) in response to the dispensing head's rotation.)

Secondary winding 1130 of transformer 1118 leads to servo-amplifier 1132, which is continuously actuated and which actuates dispensing head vertical positioning motor 440, which in turn drives pinion 430 engaged in rack 428 of elevator 42. The direction of rotation of motor 440 (and, thus, the direction of vertical movement of elevator 42) depends upon the relative magnitude of the sum of the signals impressed upon first primary winding 1116 and second primary winding 1122, versus the signal impressed on third primary winding 1128. If the latter is greater than such sum, the axis of the trunnions is above the month of the fuel tank inlet; hence, the signal from secondary winding 1130 to servo-amplifier 1132 cause motor 440 to turn in a manner to lower the elevator 42, but if the latter is less than such sum, motor 440 is rotated in the opposite direction, thus raising elevator 42. When the signal to winding 1128 equals the sum of the signals to windings 1116 and 1122, and this is the desired condition, indicating as it does that the axis of the trunnions and, hence, the dispensing head is in the correct position, no signal is transmitted from secondary winding 1130, and motor 440 is not rotated.

After the completion of the refueling operation, motor 1110 lowers probe 1102 until it contacts limit switch 1136, which signals motor control relay 1134 to stop motor 1110, leaving probe 1102 in stand-by position.

Although the technique of using systems of stored programs and numerical control to operate machinery is known, it is believed appropriate to outline broadly and in conjunction with a schematic diagram the logic (as that word is used in the relevant art) of a numerical control system which may be used in operating the automatic refueling system described in this specification. FIG. 12 symbolically illustrates the principal elements and circuitry of such logic. Two parallel arrangements are shown, one on each side of the horizontal dashed line, which provides the capability of concurrently operating two numerically controlled mechanical elements. For convenience and brevity of description, each parallel box and line on FIG. 12 will bear the same numeral, but be differentiated by letter suffixes. The use of two such arrangements is optional; one suffices for operability, and more than two merely provide for the concurrent operation of an additional mechanical element for each additional parallel arrangement.

Stored program 1202 is electrically connected through line **1204*a* to motor selector 1206*a*; through line 1208*a* to motor controller 1210*a*; and through line 1212*a* to counter 1214*a*. Counter 1214*a* is connected through line 1216*a* to motor controller 1210*a*, which in turn is connected through line 1218*a* to motor selector 1206*a*.** (The arrows on the electrical lines indicate the direction that the signal is being transmitted.)

Motor selector **1206*a* is connected to the desired motor 1220*a* through line 1222*a*, the latter being shown broken, because the same motor selector will be connected sequentially through an appropriate switch (not shown) to various motors. Motor 1220*a* is mechanically linked through linkage 1224*a* (illustratively, a rack and pinion, worm gear, chain and sprocket, spline, etc.) to the mechanical element 1226*a*** (illustratively, the bridge, carriage, elevator, outer nozzle projection arm, etc.) driven by such motor.

The distance, linear or angular, through which mechanical element **1226*a* is moved is measured electromagnetically (as illustrated by the dashed line) by measuring transducer 1230*a*, which transmits its signal through line 1232*a* to counter 1214*a*. The counter in turn signals back to the stored program through line 1234*a*** that the act instructed by the stored program has been executed, and that the logic system is ready for the next instruction.

The signal transmitted by the stored program over line **1204*a* determines the motor to be actuated; the signal transmitted over line 1208*a* determines the direction of rotation (clockwise or counterclockwise) of such motor; and the signal transmitted over line 1212*a* determines the distance, angular or linear, that its driven mechanical element 1226*a* is to move. The information signalled into motor controlled 1210*a* is transmitted through line 1218*a* and motor selector 1206*a* to motor 1220*a*.**

The signals transmitted by counter **1214*a* over line 1216*a* not only start and stop motor 1220*a*, but also slow it down, in response to the signal from measuring transducer 1230*a* transmitted over line 1232*a* indicating, when compared to the total desired distance signal received from the stored program over line 1212*a*, that the desired movement of mechanical element 1226*a* is almost complete. This avoids undesirable over-run. Accordingly, counter 1214*a*** desirably has pre-set capability and also warning capability.

Suitable counters, motor controllers and motor selectors may be electro-mechanical sub-assemblies which currently are commercially available.

Inasmuch as a plurality of clutches, all transmitting power from one motor, may be used to reduce the number of motors required, the logic system depicted by FIG. 12 may be expanded by interposing a clutch, as part of mechanical linkage 1224, between motor 1220 and mechanical element 1226, such clutch to be designated by a clutch selector (not shown) operated by electro-mechanical means upon signal from stored program 1202.

Illustrations of instances of the use of parallel logic circuits capable of simultaneously operating two mechanical elements are the concurrent traversing of bridge 46 along crane rails 48 and 50, and of carriage 44 along the bridge; the aforesaid concurrent rotation of dispensing head 38 while holding knuckle 514 stationary in space by the rotation of finger projection arm 622. However, the capability for plural concurrent operation is not essential for operability, even in the last-named instance of the preceding sentence, because in such instance the operational requirements may be satisfied (at the cost of additional time of operation and a lengthier stored program) by sequential operation in small alternate increments.

The embodiment shown in FIG. 13 includes the basic parts of a station equipped for the automated dispensing of fuel; however, in this embodiment the positioning of the vehicle from a reference point or datum plane such as a vertical plane through the rear wheel then permits the simplified location of a placed inlet means 1500 in a standardized position so that the dispensing head 1400 merely drops down over the inlet means for automatically fueling in accordance with the customer's selection of amount, type and grade of fuel from console 36.

Specifically, in the embodiment shown in FIG. 13 the inlet means 1500 appearing as an extension or probe mounted on the right front fender of the automobile may conceivably be in any location upon the exterior of the vehicle in a manner readily accessible to the dispensing head 1400 which moves down over the inlet means 1500 to form a communication for the transfer of fuel from bulk storage to the vehicle fuel tank which is connected to the inlet means 1500 by conduit means.

The vehicle mounted inlet means includes a means for fastening the inlet apparatus to a part of the vehicle. Extending from the support member is a substantially cylindrical member having a spring urged movable sleeve-type cap at the extended end. Positioned in the cylinder wall of said cap about midway on the longitudinal axis are a plurality of openings aligned about said movable sleeve. Disposed centrally within the hollow cylindrical extended member is a smaller but substantially coincidental conduit rigidly held within the hollow cylinder to form an annulus. The conduit extends through an opening in the end of the movable sleeve so that the closed end of the conduit is flush with the closed end of said movable sleeve.

The dispensing head 1400 mating with the inlet means 1500 includes a substantially cylindrical body having an opening for receiving the inlet means and for moving the sleeve-type cap so that in the final position the dispensing head communicates with the annulus of the inlet means and with the rigid conduit means disposed therein. The dispensing head 1400 includes a receiving end for admitting the inlet means 1500, a guided spring urged plunger rigidly mounted on a shaft including an inlet end for receiving gasoline, a vacuum port, and a flexible mounting member.

Referring to FIG. 14, 1400 generally designates the dispensing head and 1500 numerically designates the vehicle mounted inlet means. The inlet means 1500 includes the movable cap-type sleeve 1501 having a top 1502 with an opening 1503 which accommodates the internal conduit 1504. Sleeve 1501 has a plurality of openings 1505 forming a belt about midway of its longitudinal axis and an outwardly projecting exterior surface 1506 commencing below the openings 1505.

Inlet means 1500 also includes base 1507 supporting the extended cylindrical member 1508 therefrom. The extended member 1508 is substantially circular in cross-section and cylindrical in shape with openings 1509 positioned in an orientation so that they are alignable with openings 1505 in movable sleeve 1501. Disposed centrally within cylindrical member 1508 is rigid substantially coincidental conduit 1504 providing an annulus 1510 between conduit 1504 and cylinder 1508.

Conduit 1504 terminates in a closed end 1511 and has a plurality of openings 1512 located in a beltlike orientation a short distance below end 1511. Extended member 1508 has top 1513 with a central opening 1514 shaped to accommodate conduit 1504 and top 1513 has air ports 1516. Spring member 1517 is located between top 1513 and sleeve end 1502. Fastening means 1518 connects member 1508 with support 1507. Support 1507 is provided with base opening 1519 and fastening means 1520.

Dispensing head 1400 has a first housing portion 1401 with a bell-shaped opening 1402, O-ring 1403, and fastening means 1404 with peripheral seal 1405. Seal 1405 extends about the interior floor 1406 which forms a surface at the top of first portion 1401.

A second housing portion 1407 is substantially cylindrical in shape with a generally hollow interior, a second portion terminating at each end in fastening means 1408 and 1409 respectively. Located below fastening means 1409 is peripheral seal 1410, and fuel inlet port 1411 having fuel inlet means 1412 attached thereto by fastening means 1413. Top portion 1414 has flexible support means 1415 attached thereto by fastening means 1416. Top portion 46 also has vacuum port 1417 communicating through passageway 1418 and passageway 1419.

Top portion 1414 includes in its unitary structure a shaftlike extension 1420 terminating in a cylindrically shaped pistonlike guide 1421 having openings 1422 and a countersunk end 1423 to receive the spring means 1424. Opening 1419 terminates at the countersunk floor 1425 of piston 1421. Spring means 1424 is seated on the top countersunk floor 1426 of closure means 1427 and rests against the countersunk floor 1425 of piston 1421. Closure means 1427 has hollow shaft 1428 extending upward from floor 1426 and shaft 1428 fits snugly within passageway 1419. The lower portion of closure means 1427 is adapted to receive the inlet means 1500 and rests upon the top 1502 of the sleeve-type cap 1501. The closure means 1427 has a peripheral seal 1429 around its lower face 1430.

In operation, when a vehicle is positioned in a station equipped to automatically transfer fuel from storage to the vehicle fuel tank, the vehicle having the inlet means 1500 mounted thereon in a standardized location such as the left front fender, the dispensing head flexibly supported from the support means 1415 is moved into position above the inlet means 1500 by means shown in FIG. 13 and elsewhere and the dispensing head moves into contact with the inlet means 1500. As the top portion of the antenna, namely, the spring urged movable sleeve 1501, comes into contact with any portion of the bell shaped opening 1402 of the first housing portion 1401, the structure of the opening 1402 permits continued contact and reception of the inlet means.

As the inlet means 1500 continues to move into position, the downwardly projecting bevelled surface 1506 or shoulder of sleeve 1501 contacts the inner wall of the opening 1402 and sleeve 1501 travels downward in relation to the coincidental cylindrically shaped extended member 1508. As the sleeve moves downward the conduit end 1511 becomes exposed through the opening in top 1502. The internal conduit 1504 has openings in close association with the top 1502, which top is introduced into the opening of closure means 1429 in communication with passageway 1419 through hollow shaft 1428. Spring means 1517 is compressed between top 1502 of sleeve 1501 and top 1513 of extended cylindrical member 1508. The spring means is so constructed to allow sleeve 1501 to move an amount sufficient to align the openings 1505 in sleeve 1501 with the openings 1509 in the extended cylindrical member 1508. This, in effect, is the final position wherein communication has been established between the fuel inlet means 1412 and the vehicle fuel tank.

As the inlet means 1500 is positioned sleeve 1501 moves downward exposing openings 1505 in sleeve 1501 and openings 1509 in cylinder 1508 while at the same time closure means 1427 having face 1430 with seal 1429 moves upward off floor 1406 of first housing 1401 to expose the openings 1505 and 1509. The closure means 1427 moving upward presses spring 1424 and permits hollow shaft 1428 to move an additional increment into receiving shaft 1420 while end 1511 of conduit 1504 moves into the closure means 1427 allowing openings 1512 in conduit 1504 to communicate with passageways 1419 and 1418 respectively. Consequently, not only is fuel inlet means communicating through fuel inlet port 1411 and through the dispensing head and openings 1505 and 1509 with the vehicle fuel tank, but also vacuum port 1417 communicates with the vehicle tank through passageways 1418 and 1419, and openings 1512 in conduit 1504.

Fuel inlet means 1412 having housing **1412*a* and electrical connections 1412*b* has within the housing 1412*a* opening means and closing means such as solenoids for commencing and interrupting the flow of gasoline through the fuel inlet port 1411, the dispensing head 1400, and the inlet means 1500. The control means electrically connected through conductors 1412** are shown elsewhere.

Port 1417 located in the top portion 1414 of dispensing head 1400 and communicating through passageways 1418 and 1419 respectively with internal conduit 1504 through openings 1512 of conduit 1504 is connected to a vacuum producing source and communicates interiorly near the top of the vehicle fuel tank. When fuel flows through fuel inlet means 1412, fuel inlet port 1411, dispensing head 1400, and extended cylinder 1508 to the vehicle fuel tank a vacuum through port 1417 is applied to the vehicle fuel tank to function as a vent and a sensor. Should any obstruction occur, especially when the vehicle fuel tank is approaching the filled condition the level of the tank rises to the height where the vacuum line extending from internal conduit 1504 is located, thus preventing, reducing, or restricting the flow of air from said tank which immediately interrupts the flow of fuel at fuel inlet means 1412 as a result of the connection of port 1417 through a control means with electrical connectors **1412*b*. Thus, the vacuum applied at port 1417 functions as a vent means, a control mechanism, and a safety device for immediately interrupting the flow of fuel at fuel inlet means 1412** to prevent the inherently dangerous occurrence of situations arising during the handling of flammable materials.

When the dispensing head is finally positioned with respect to the inlet means 1500 the control means directs the application of a vacuum to port 1417 and the commencement of the flow of fuel through fuel inlet means 1412 and fuel inlet port 1411 occurs. The fuel flows into the dispensing head 1400 and around the unitary shaft 1420 projecting from top portion 1414. The flow continues through the piston guide means 121 having openings 1422 in the second housing portion 1407. When the fuel reaches floor 1406 of first housing 1401 after flowing around closure means 1427 which forms the annular opening interrupted only by three guide means **1427*a*, the fuel passes through aligned openings 1505 and 1509 into the annulus of internal conduit 1504 and extended cylindrical member 1508. As the fuel reaches the interior of support 1507 and base opening 1519 a cross-over may provide the connection with the annulus 1510 and the internal vacuum conduit 1504**, or a plurality of coincidental conduits may be used to transport the fuel to the vehicle tank while maintaining a vacuum internally near the top of the tank.

The dispensing head of this invention in combination with the novel inlet means provide a method and apparatus which can be utilized in this system for automatically dispensing fuel from a source of supply to a vehicle fuel tank without the aid of an attendant. The novel structure herein further provides a safe and reliable apparatus for joining a source of supply with a receiving means for carrying out the objectives inherently a part of automatically dispensing fuels to vehicles in an unattended manner.

Dimensionally, the inlet means can have a height of about 5 to 7 inches and a diameter of about 1 inch, the base being about 1 to 2 inches in height. The cylindrical portion of the dispensing head may have a height of about 5 to 7 inches, a diameter of about 2½ to 3 inches and the wall thickness of the second housing portion 39 can have a thickness of about ¼ of an inch. First housing portion 33 can be about 2 to 2½ inches in height, and the top portion 46 can be about ½ of an inch in height. One such embodiment of the dispensing head measured 2¾ inches in diameter and about 6⅜ inches in height. The construction of the inlet means is generally of metal which may have a bright metal finish in order to enhance the attractiveness of it since it is contemplated to be in a rather conspicuous and standardized location on the exterior of a vehicle, such as, at the top of a front fender.

The amount of vacuum through port 1417 under normal operation is negligible and can be slightly below zero p.s.i.g. However, when the level of fuel in the vehicle tank reaches the vacuum line located toward the top and internally of said tank, the amount of vacuum in the line increases substantially, thus actuating a switch, such as a diaphragm loaded switch which interrupts the flow of fuel. Thus, the amount of vacuum applied may range from slightly below zero to about −10 p.s.i.g. or more. However, the amount of vacuum or the range of negative pressure is merely enough to establish a differential pressure within the vacuum line to effectuate the interruption of the flow of fuel therein and to vent the vehicle fuel tank.

Referring to FIG. 15, in the perspective view, an axle mounted inlet means and a dispensing head are shown. The dispensing head generally designated 1550 is pivotly mounted at pivots 1551 on support members 1552 and 1553 along the base 1554 on dispensing head 1550. Attached to the base 1554 and integrally formed thereon is the receiver 1555 having an internal face 1556 with a shape adaptable to communicate with the inlet means.

A plurality of conduits are connected to the dispensing head 1550. Fill line 1557 is connected from a bulk fuel storage (not shown) to the base 1554 of the dispensing head 1550. Fill line 1557 terminates in a probelike end having a closed top and openings about the cylindrical wall protruding above the face 1556 of receiver 1555. Another conduit, a vent line 1558, adaptable for making communication with the vehicle fuel tank is connected to the dispensing head 1550 at the bottom of the receiver 1555 and terminates in an extended cylinder having a closed top with openings about the walls above the face 1556 of the receiver. Sensor means 1559 communicates with the receiver 1555 and like the vent means and fill line terminates in a closed cylinderlike projection from the face 1556 of the receiver, the sensor means having openings in the walls of the protruding cylindrical terminus. The plurality of conduits 1558 and 1559 extend from the base of the receiver 1555 to a vacuum producing source and to the bulk storage.

The inlet means generally designated 1600 has contact face 1601, sensor port 1602, fill port 1603 and vent port 1604. Communicating with these ports are a plurality of conduits including a sensor line 1605, a fuel line 1606 and a vent line 1607 terminating in the fuel tank of the vehicle. Fastening means 1608 hold the inlet means 1600 to the underside of the vehicle which in this instance is located under the right rear axle 1609 which is attached to the differential housing 1610 by collar 1611. Each of the ports in the face 1601 of inlet means 1600 has resilient closure means 1602*a*, 1603*a* and 1604*a*.

Referring now to FIG. 16, the dispensing head 1550 and the inlet means 1600 are shown in cross-section in an elevation view to portray the final positioning when the contact face 1556 of dispensing head 1550 and the contact face 1601 of inlet means 1600 are joined for communication for the automatic dispensing of fuel. Dispensing head 1550 having receiver 1555 with contact face 1556 is equipped with outwardly extending bevelled walls 1556*a* which slope outwardly to shape the receiver to receive the inlet means 1600. Protruding above the contact face 1556 of the dispensing head 1550 are the plurality of probes for sensing, filling, and venting, numerically designated 1560, 1561 and 1562 respectively, each having closed tops and openings in the cylindrical wall. At the base of the probes and concentrically located about each of them is an O-ring or gasket-type seal designated 1560*a*, 1561*a* and 1562*a* for the sensing, filling and venting respectively. Another sealing member 1563 surrounds all three of the probes and seals for positive sealing when the respective faces of the inlet means and dispensing head are finally positioned.

The inlet means 1600, as shown in FIG. 16, also is equipped with three check valves designated 1612, 1613 and 1614 for the sensing, filing, and venting lines respectively. Each of the check valves include a housing 1612*a*, 1613*a* and 1614*a* respectively terminating at the top in sensing, filling and venting lines 1605, 1606 and 1607 respectively. Contained within the housings are spring means 1612*b*, 1613*b* and 1614*b* designed to exert a force against the resilient closure means 1602*a*, 1603*a* and 1604*a* respectively to close the sensor, filling, and venting ports.

In operation, the automatic fuel dispensing apparatus of this invention commences to function when a vehicle enters the station and the vehicle positioning means so that the console for selecting the type, grade and amount of fuel is adjacent the driver. After the selection and the insertion of money or a credit card the dispensing head 1550 is guided upward from its recessed position of rest in the station floor for contact with and engagement of the inlet means 1600 so that communication exists through the sensor means 1559, vent means 1558 and fill line 1557 and the sensor, fuel and vent lines 1605, 1606 and 1607 respectively extending from the inlet means 1600 and terminating in the vehicle fuel tank.

The communication made during the final positioning of dispensing head face 1556 joining with inlet means face 1601 requires that the sensor, filling and venting probes or projections extending from the dispensing head face extend into the check valve housings 1612*a*, 1613*a*, and 1614*a* respectively of the inlet means. This is accomplished by the force exerted by the closed tops of the probes against the closure means 1602*a*, 1603*a* and 1604*a* of the check valves 1612, 1613 and 1614 located immediately above each of the sensor, filling and venting ports 1602, 1603 and 1604 respectively in face 1601 of inlet means 1600. Since the interior walls of the check valve housings are larger than the outer walls of the probes, the annular area permits communication and the filling probe 1561 acts as a nozzle for emitting fuel under pressure which is forced to the tank via fill line 1606.

In the embodiments portraying inlet means and dispensing heads, wherein the inlet means communicates through conduits with the vehicle fuel tank or where the inlet means is located integrally with the vehicle tank, check valves similar to those shown above are placed to ensure that backflow does not occur from the vehicle tank. Where the inlet means is mounted under the vehicle, or at some point on the body of the vehicle, a check valve is located at the vehicle tank entrance.

The inlet means mounted under the vehicle, such as on an axle and the mating dispensing head provide a safe, non-obvious location for establishing communication between the vehicle tank and fuel bulk storage for the automatic dispensing of fuel. The compactness of the inlet means does not obstruct clearance between the vehicle and the road surface and the location is relatively free from dirt, etc. The mating surface of the probe and check valve structure are such that dirt on the surface is trapped between the mating surfaces such as contact surface 1601 of inlet means 1600 and surface 1556 of dispensing head 1550 and between the closed tops of the cylindrically shaped probes and the lower surface of the spring urged closure means of the check valves so that no dirt gains entry to the fuel line 1606 of the vehicle tank.

When the dispensing head 1550 moves up and into position against the contact face 1601 of the inlet means 1600, the dispensing head pivotally mounted on support members 1552 and 1553 are so arranged that freedom of movement in vertical, horizontal and lateral directions in conjunction with the bevelled edges 1556*a* of the receiver 1555 permit positive positioning within at least a 3" variation so that even if one vehicle tire is flat final positioning of the dispensing head with the inlet means can occur.

Ample safety factors are inherent in the design since a plurality of gaskets and/or O-rings seal the communicating lines from the atmosphere to prevent leakage of liquids and/or gases. Additionally, the sensing means communicating with the vehicle tank will not permit the commencement of fueling if any obstruction occurs and should an obstructing leak occur during filling flow is immediately interrupted. The sensing means has a slight negative pressure developed by a source of vacuum and should any obstructing communication exist through any of the seals or O-rings the negative pressure in the line immediately changes to about minus 5 p.s.i.g. or more to abort the process which will not be commenced until sealing has occurred.

I claim:

1. A system for automatically fueling automotive vehicles which comprises:

(1) dispensing means for transferring fuel from bulk storage to an inlet of a fuel tank in a vehicle, which includes a movable dispensing head and associated nozzle, said fuel tank inlet being provided with closure means and said dispensing head including means adapted to open and close said closure means;
(2) means for locating the vehicle in reference to said dispensing means;
(3) guidance means for moving said dispensing head and associated nozzle to the fuel tank inlet;
(4) means for engaging-disengaging said nozzle and said fuel tank inlet;
(5) fuel flow means including automatic cut-off means for controllably flowing fuel through said nozzle;
(6) control means responsive to customer's selection of amount and type of fuel for actuating and controlling the movements of said dispensing means and for sequencing all steps including means for interrupting the automatic operation of the system;
(7) identification-selector means adapted to transmit a signal to said control means identifying the vehicle to be fueled with respect to make and model.

2. The system of claim 1 wherein the vehicle locating means includes means for positioning the vehicle a predetermined distance from a neutral control position for the dispensing head.

3. The system of claim 1 for automatically fueling automotive vehicles wherein said fuel tank inlet means is located below the body of said vehicles.

4. The system of claim 1 for automatically fueling automotive vehicles wherein said fuel tank inlet means are located on the body of said vehicles.

5. The system of claim 1 wherein the identification-selector means includes means for selecting the quantity and grade of fuel to be dispensed.

6. A system for automatically fueling automotive vehicles which comprises:

(1) dispensing means for transferring fuel from bulk storage to an inlet of a fuel tank in a vehicle, which includes a movable dispensing head and associated nozzle;

(2) sensing means for monitoring continuously the height of the fuel tank inlet above a known datum point and means for adjusting the position of the dispensing head in response thereto;

(3) means for locating the vehicle in reference to said dispensing means;

(4) guidance means for moving said dispensing head and associated nozzle to the fuel tank inlet;

(5) means for engaging-disengaging said nozzle and said fuel tank inlet;

(6) fuel flow means including automatic cut-off means for controllably flowing fuel through said nozzle;

(7) control means responsive to customer's selection of amount and type of fuel for actuating and controlling the movements of said dispensing means and for sequencing all steps including means for interrupting the automatic operation of the system.

7. The system of claim 6 wherein the vehicle locating means includes means for positioning the vehicle a predetermined distance from a neutral control position for the dispensing head.

8. The system of claim 6 for automatically fueling automotive vehicles wherein said fuel tank inlet means is located below the body of said vehicles.

9. The system of claim 6 for automatically fueling automotive vehicles wherein said fuel tank inlet means are located on the body of said vehicles.

10. The system of claim 6 which includes identification-selector means adapted to transmit a signal to said control means identifying the vehicle to be fueled with respect to make and model.

11. The system of claim 10 wherein the identification-selector means includes means for selecting the quantity and grade of fuel to be dispensed.

12. A station for automatically fueling automotive vehicles which comprises:

(1) a dispensing head having an associated nozzle for transferring fuel from bulk storage to an inlet of a fuel tank in a vehicle, said head being located above the floor of the station and mounted to move in both a horizontal and vertical direction;

(2) means on the floor of the station adapted to engage the wheels of the vehicle and locate said vehicle at a predetermined reference position;

(3) guidance apparatus coupled to the dispensing head for moving said head to the inlet and inserting said nozzle into said inlet;

(4) a fuel flow control associated with said dispensing head for turning on and shutting off the fuel flow through said nozzle; and (5) a control console in the station adapted to receive an order from a customer, said console including:

(a) an identification selector having a switch operated by the customer, said switch upon being operated providing a signal identifying the make and model of the vehicle being refueled, and (b) programming means including a stored program of guidance and control information for the dispensing head based upon the fuel tank inlet position for a plurality of different makes and models of automotive vehicles, said programming means being responsive to said signal and providing upon receiving said signal appropriate guidance information for the head in accordance with the type of vehicle being refueled so that the nozzle of the dispensing head is inserted correctly into said inlet and the fuel flow control is operated until a predetermined quantity of fuel flows into the tank.

13. The system defined in claim 12 wherein said fuel inlet tank is provided with a closure cap and said dispensing head includes means adapted to selectively remove and replace said closure cap.

14. The system defined in claim 12 additionally including sensing means for monitoring continuously the height of the fuel tank inlet above a known datum point and means for adjusting the position of the dispensing head in response thereto.

15. The system defined in claim 12 wherein said means engaging the wheels of the vehicle include means for moving said wheels both longitudinally and laterally.

16. In an automatic automotive vehicle fueling system including dispensing means having a nozzle for transferring fuel from bulk storage to an inlet of the fuel tank in the vehicle, means for locating the vehicle in reference to the dispensing means, guidance means for moving the dispensing means and nozzle to the fuel tank inlet, means for engaging and disengaging said nozzle and fuel tank inlet, and fuel flow means for controlling the flow of fuel through said nozzle; the improvement comprising control means in said system which is adapted to receive an order from the customer, said control means including identification and selection means operated by the customer to provide a signal identifying the model and make of vehicle being fueled, and programming means including a stored program of guidance and control information for the dispensing means based on the fuel tank inlet position for a plurality of different makes and models of automotive vehicles, said programming means being responsive to said signal and providing upon receiving said signal appropriate guidance information for the dispensing means so that the nozzle of the dispensing means in inserted correctly into said fuel tank inlet.

References Cited

UNITED STATES PATENTS

| | | | |
|---|---|---|---|
| 3,079,960 | 3/1963 | Mays | 137—234.6 X |
| 3,095,020 | 6/1963 | Darwin | 137—234.6 X |
| 3,100,006 | 8/1963 | Sheets et al. | 141—279 X |

FOREIGN PATENTS

| | | |
|---|---|---|
| 618,397 | 4/1961 | Canada. |

LAVERNE D. GEIGER, Primary Examiner

E. J. EARLS, Assistant Examiner

U.S. Cl. X.R.

137—234.6; 141—232; 222—76